United States Patent
Liu et al.

(10) Patent No.: US 11,152,021 B1
(45) Date of Patent: Oct. 19, 2021

(54) PERPENDICULAR MAGNETIC RECORDING (PMR) WRITER WITH TUNABLE POLE PROTRUSION (TPP) DESIGNS FOR 2 TERABYTES/PLATTER (TB/P) AND BEYOND

(71) Applicant: Headway Technologies, Inc., Milpitas, CA (US)

(72) Inventors: Yue Liu, Fremont, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/095,861

(22) Filed: Nov. 12, 2020

(51) Int. Cl.
| | |
|---|---|
| G11B 5/187 | (2006.01) |
| G11B 5/39 | (2006.01) |
| G11B 5/60 | (2006.01) |
| G11B 5/48 | (2006.01) |
| G11B 5/245 | (2006.01) |
| G11B 5/00 | (2006.01) |
| G11B 5/127 | (2006.01) |

(52) U.S. Cl.
CPC .......... *G11B 5/3912* (2013.01); *G11B 5/2457* (2013.01); *G11B 5/3938* (2013.01); *G11B 5/3941* (2013.01); *G11B 5/4826* (2013.01); *G11B 5/607* (2013.01); *G11B 5/127* (2013.01); *G11B 5/187* (2013.01); *G11B 2005/0018* (2013.01)

(58) Field of Classification Search
None
See application file for complete search history.

(56) References Cited

U.S. PATENT DOCUMENTS

| | | | |
|---|---|---|---|
| 6,665,136 B2 | 12/2003 | Clinton et al. |
| 7,907,360 B2 | 3/2011 | Mak et al. |
| 8,218,264 B1 | 7/2012 | Sasaki et al. |
| 8,274,758 B2 | 9/2012 | Wu et al. |
| 8,347,489 B2 | 1/2013 | Hong et al. |
| 8,582,241 B1 | 11/2013 | Yu et al. |
| 8,810,764 B2 | 8/2014 | Nishida et al. |
| 8,828,248 B2 | 9/2014 | Mao et al. |

(Continued)

OTHER PUBLICATIONS

U.S. Notice of Allowance, U.S. Appl. No. 16/254,755, First Named Inventor: Yue Liu, dated Dec. 26, 2019, 8 pages.

(Continued)

*Primary Examiner* — William J Klimowicz
(74) *Attorney, Agent, or Firm* — Saile Ackerman LLC; Stephen B. Ackerman

(57) ABSTRACT

A perpendicular magnetic recording (PMR) writer is disclosed wherein an insulation layer is formed between a top yoke (TY) and an uppermost (PP3) trailing shield to electrically isolate the main pole (MP) from a trailing loop for magnetic flux return. One or both of a first non-magnetic (NM) metal layer and a second NM metal layer are formed between the MP tip and a hot seed layer and side shields, respectively, to form an electrical path that is in parallel to that of a dynamic fly height (DFH) heater circuit. MP tip protrusion is enhanced and writability is improved especially for track widths <40 nm, and is tunable by the volume of the first and second NM layer, and the composition of the NM metals. Existing writer pad layouts may be employed and there is no additional cost to PMR backend processes.

15 Claims, 14 Drawing Sheets

(56) References Cited

U.S. PATENT DOCUMENTS

| | | |
|---|---|---|
| 8,836,059 B2 | 9/2014 | Ahn et al. |
| 8,861,137 B1 * | 10/2014 | Lam .................... G11B 5/315 |
| | | 360/125.3 |
| 9,171,561 B1 | 10/2015 | Gadbois et al. |
| 9,387,568 B1 | 7/2016 | Ilaw et al. |
| 9,613,642 B1 | 4/2017 | Erden et al. |
| 9,697,855 B1 | 7/2017 | Liu et al. |
| 9,754,612 B2 | 9/2017 | Wei et al. |
| 9,805,744 B1 | 10/2017 | Xue et al. |
| 10,014,021 B1 | 7/2018 | Liu et al. |
| 10,311,900 B1 | 6/2019 | Liu et al. |
| 10,366,713 B1 | 7/2019 | Tang et al. |
| 10,418,054 B1 | 9/2019 | Liu |
| 10,482,905 B2 | 11/2019 | Liu et al. |
| 10,522,178 B1 * | 12/2019 | Liu .................... G11B 5/11 |
| 10,643,640 B1 | 5/2020 | Liu et al. |
| 10,916,261 B1 * | 2/2021 | Liu .................... G11B 5/315 |
| 2006/0145721 A1 | 7/2006 | Ton-Churo |
| 2008/0225426 A1 | 9/2008 | Roy et al. |
| 2009/0067098 A1 | 3/2009 | Kim et al. |
| 2010/0007986 A1 | 1/2010 | Mak et al. |
| 2011/0097601 A1 * | 4/2011 | Bai .................... G11B 5/315 |
| | | 428/815 |
| 2012/0050915 A1 | 3/2012 | Hong et al. |
| 2013/0083433 A1 | 4/2013 | Sonda et al. |
| 2016/0254014 A1 | 9/2016 | Biskebom et al. |
| 2017/0256275 A1 | 9/2017 | Hutchinson et al. |
| 2019/0304490 A1 * | 10/2019 | Liu .................... G11B 5/1278 |
| 2019/0333531 A1 * | 10/2019 | Liu .................... G11B 5/1278 |
| 2020/0312354 A1 * | 10/2020 | Wu .................... G11B 5/3143 |

OTHER PUBLICATIONS

"The Feasibility of Magnetic Recording at 10 Terabits Per Square Inch on Conventional Media," IEEE Transactions on Magnetics (vol. 45, Issue: 2, Feb. 10, 2009), pp. 917-923.

* cited by examiner

PERPENDICULAR MAGNETIC RECORDING (PMR) WRITER WITH TUNABLE POLE PROTRUSION (TPP) DESIGNS FOR 2 TERABYTES/PLATTER (TB/P) AND BEYOND

RELATED PATENT APPLICATION

This application is related to U.S. Pat. No. 10,643,640; which is assigned to a common assignee and herein incorporated by reference in its entirety.

TECHNICAL FIELD

The present disclosure relates to a PMR write head configured to have a one turn coil (1+1T) design with tunable pole protrusion wherein the MP tip is electrically connected to one or both of the trailing shield hot seed (HS) layer and side shields (SS) in a path parallel to the dynamic fly height (DFH) writer heater while a MP back portion is electrically isolated from the trailing and leading flux return loops so that MP protrusion can achieve a range of 0.5-0.8 micron even for a MP track width (PWA) of less than 40 nm, and provide better writability.

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole (MP) through two pathways including a trailing (top) loop and a leading (bottom) loop. The trailing loop is comprised a trailing shield structure with a front side at the ABS, an uppermost trailing (PP3) shield that arches over the driving coil and connects with a top yoke (TY). The TY adjoins a top surface of the MP above a back gap connection (BGC). The trailing loop is also known as the top driving loop and delivers magnetic flux to the MP tip to write positive and negative field into magnetic media. The leading loop has a leading shield with a side at the ABS and in some schemes is connected to a return path (RTP) having a front side recessed from the ABS. The RTP extends back to the BGC and enables magnetic flux in the leading loop pathway to return from the leading shield at the ABS and through the BGC to the MP for faster saturation speed, better adjacent track interference (ATI) and enhanced wide area track erasure (WATE) potential.

Dual write shield (DWS) designs that feature complete leading and trailing loops were invented for adjacent track erasure (ATE) improvement by reducing stray field in side shields and in the leading shield and trailing shields. Accordingly, a PMR head has a great advantage over LMR in providing higher write field, better read back signal, and potentially much higher areal density. With the growing demand for cloud storage and cloud-based network computing, high and ultra high data rate recording becomes important for high-end disk drive applications.

To achieve areal density in a HDD beyond 2 TB/P for conventional PMR in near line applications, OD high data rate (HDR) performance up to 3.4 gigabytes per second (Gbps) or 1.7 gigahertz (GHz) is essential and critical. A one turn coil design (1+1T) has demonstrated better HDR performance than a two turn coil design (1+1+2T or 2+2T) because of less electrical inductance and more compact magnetic loop with shorter yoke length (YL). Magnetomotive force (MMF) of a one turn coil design is half that of a 2+2T design. Under direct current (DC) or low frequency alternating current (AC) applications, a one turn coil writer requires two times the current of a two turn coil writer to drive a head to the same magnetic field level. However, under high frequency for HDR applications, the 1+1T design has demonstrated an advantage in reaching the same magnetic field level with 1.2-1.5 times the current of a two turn coil design for 1.75 TBPP application with a data rate up to 3.1 Gbps (1.55 GHz). Thus, the 1+1T design, which can operate at less than 1.5× the Iw(0-peak) current of 1+1+2T or 2+2T designs offers less driving to the write shield and better WATE capability that is critical for near line applications.

For 2 terabytes/platter (TB/P) and beyond, write erase width (EW) needs to be <50 nm to achieve 480-500 k tracks per inch (TPI) capability. At such narrow EW, MP tip width (PWA) is likely <40 nm considering a magnetic write bubble fringing of around 10 nm or more. Thus, there is a challenge for a MP with PWA <40 nm to maintain enough writability and down-track gradient to satisfy kilo flux changes per inch (kFCI) and area density capability (ADC) requirements. FIG. 4 depicts the trend in MP tip protrusion (PTR) vs. PWA. The MP PWA sweet spot is estimated to be 0.5-0.8 micron from existing products with good writing quality without MP wearing reliability issues. Accordingly, there is a need to design a write head with a PWA <40 nm that is capable of achieving a PTR in the range of 0.5-0.8 micron.

SUMMARY

One objective of the present disclosure is to provide a PMR writer with a 1+1T coil layout that is capable of achieving a MP tip protrusion in the range of 0.5-0.8 micron even for a PWA <40 nm.

Another objective of the present disclosure is to provide a PMR writer according to the first objective without changing the existing pad layout in current PMR heads, and that is transparent to existing PMR backend and HDD processes and may be implemented without modification of existing hardware and software.

A third objective of the present disclosure is to provide a method of fabricating a PMR writer that satisfies the first two objectives.

These objectives are achieved by configuring a PMR writer preferably having a 1+1T coil design wherein the trailing (top) loop for magnetic flux return to the MP has an ultimate double yoke (uDY) design or an Easy Planar (ePL) scheme. The leading (bottom) flux return loop has a so-called recessed DWS (rDWS) BGC or non-DWS (nDWS) structure.

A key feature is that an electrical path is introduced through the MP tip in a path parallel to the DFH writer heater without changing the existing writer pad layout. When the DFH writer heater is turned on, a branch of current flows through the MP tip to heat the MP tip region. As a result of local heating, MP tip protrusion is enhanced and writability is improved. Writer shields are electrically connected to the DFH ground (−) pad. The MP tip is electrically connected to one or both of the trailing shield HS layer and side shields (SS). A MP back portion is electrically connected to a built-in series resistor (Rs) that is electrically connected to the DFH (+) pad. The nominal resistance of Rs is specifically designed to satisfy both DFH heater power and MP tip protrusion requirements.

The tunable PTR aspect arises from the volume and location as well as the metal selected for the one or more non-magnetic (NM) metal layers used to make the electrical connection between the MP tip and shield structure since the aforementioned tuning parameters affect MP tip resistance (R_tip) and heating. In a first embodiment, a first NM metal layer has a width proximate to the PWA (no more than PWA+2×SG (side gap) width when the SG is not NM metal layer) and is formed between the MP trailing side and HS layer at the ABS, or alternatively is recessed behind the ABS. In another embodiment, the first embodiment is modified to also include a second NM metal layer in a side gap between each MP side and SS at the ABS. In other embodiments, the first NM metal layer has a width essentially equal to that of the HS layer and fills the entire WG, or is formed only in the side gaps. There is an additional embodiment where the first NM metal layer is formed in the entire WG at the ABS and the second NM metal layer is in the side gaps at the ABS.

The present disclosure also encompasses a method for fabricating the PMR writer according to embodiments described previously. In an example where the PMR writer has a uDY nDWS scheme, the fabrication follows the sequence described in related U.S. Pat. No. 10,643,640 except the additional steps of forming a photoresist mask over the write shield (WS) and driving coil, and then depositing an insulation layer on the top yoke are performed prior to plating the PP3 shield on the WS and above the top yoke.

DETAILED DESCRIPTION

Figure 1:
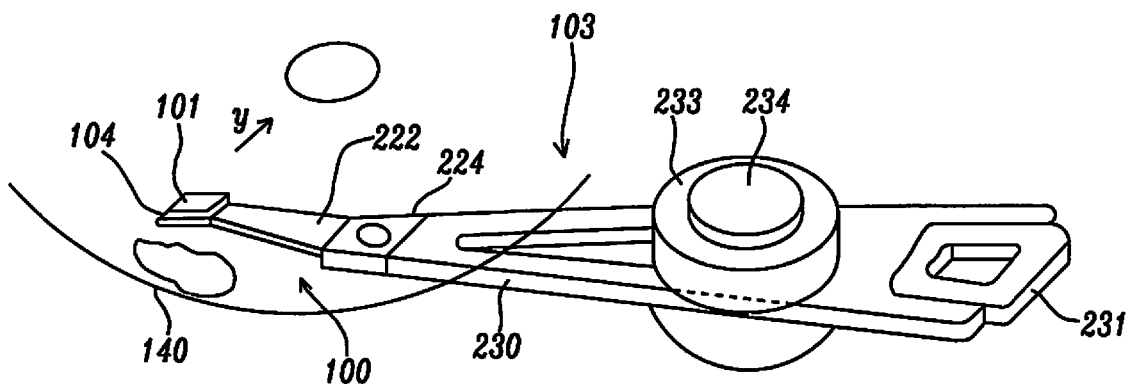
FIG. 1 is a perspective view of a head arm assembly of the present disclosure.

The present disclosure relates to a PMR writer with a tunable MP tip protrusion where an electrical connection is made between the MP tip and one or both of the trailing shield HS layer and side shields, and where the writer shields are electrically connected to a DFH ground (−) pad. A MP back portion is electrically isolated from the leading and trailing loops for flux return to the MP, but is electrically connected to a built-in series resistor that is electrically connected to the DFH (+) pad. The writer scheme is especially effective in enhancing MP protrusion for a MP PWA <40 nm, and improving writability. In the drawings, the y-axis is a cross-track direction, the z-axis is a down-track direction, and the x-axis is in a direction orthogonal to the ABS and towards a back end of the device. Dimensions of writer components are expressed as a width in the y-axis direction, height in the x-axis direction, and thickness in the z-axis direction. The term "front side" is defined as the side of a layer that faces the ABS or is at the ABS while a "backside" is a side facing away from the ABS. Although the exemplary embodiments relate to a 1+1T coil design, the MP TPP scheme disclosed herein may also be employed with other coil designs including well known 1+1+2T and 2+2T layouts.

Referring to FIG. 1, a HGA 100 includes a magnetic recording head 101 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
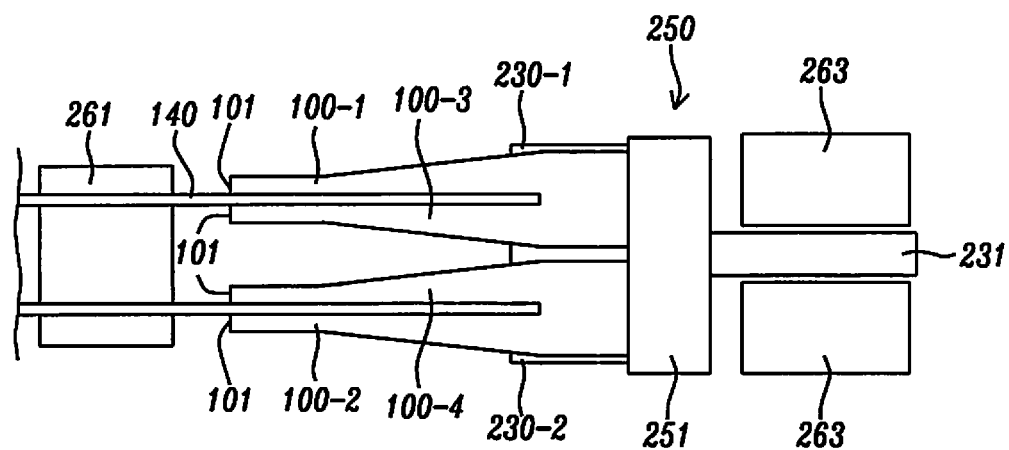
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a plurality of HGAs (HGA 100-1 and second HGA 100-2 are at outer positions while HGA 100-3 and HGA 100-4 are at inner positions) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
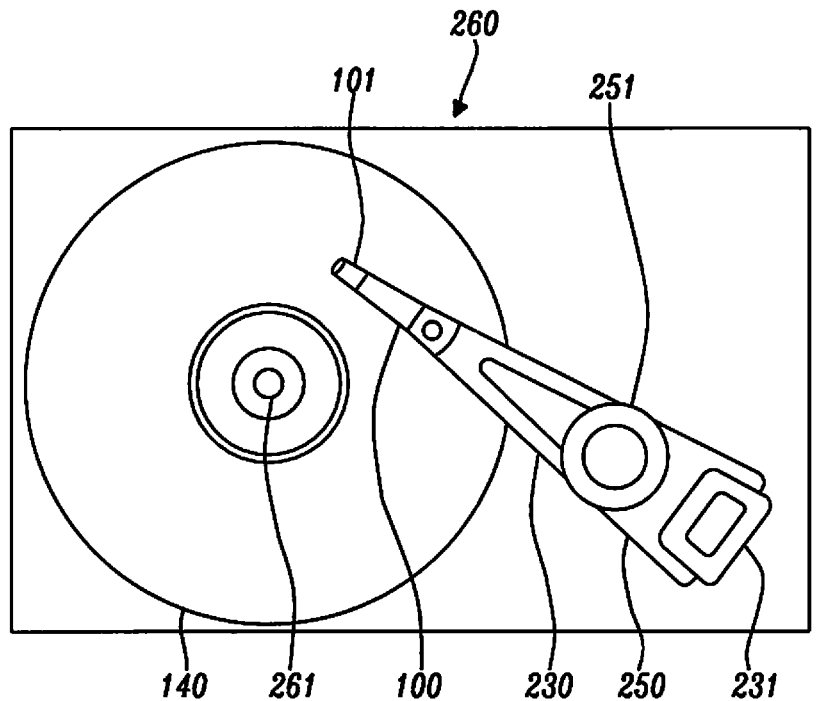
FIG. 3 is a plan view of a magnetic recording apparatus of the present disclosure.
Figure 4:
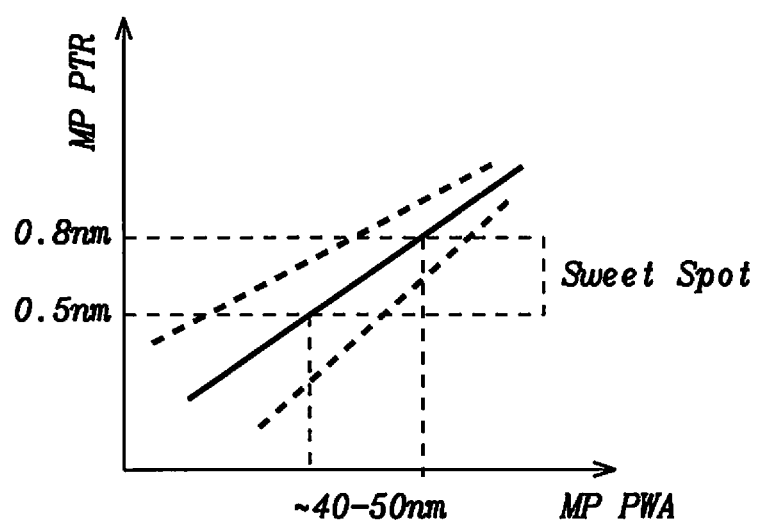
FIG. 4 is schematic of a typical MP tip protrusion vs. MP PWA trend.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 5:
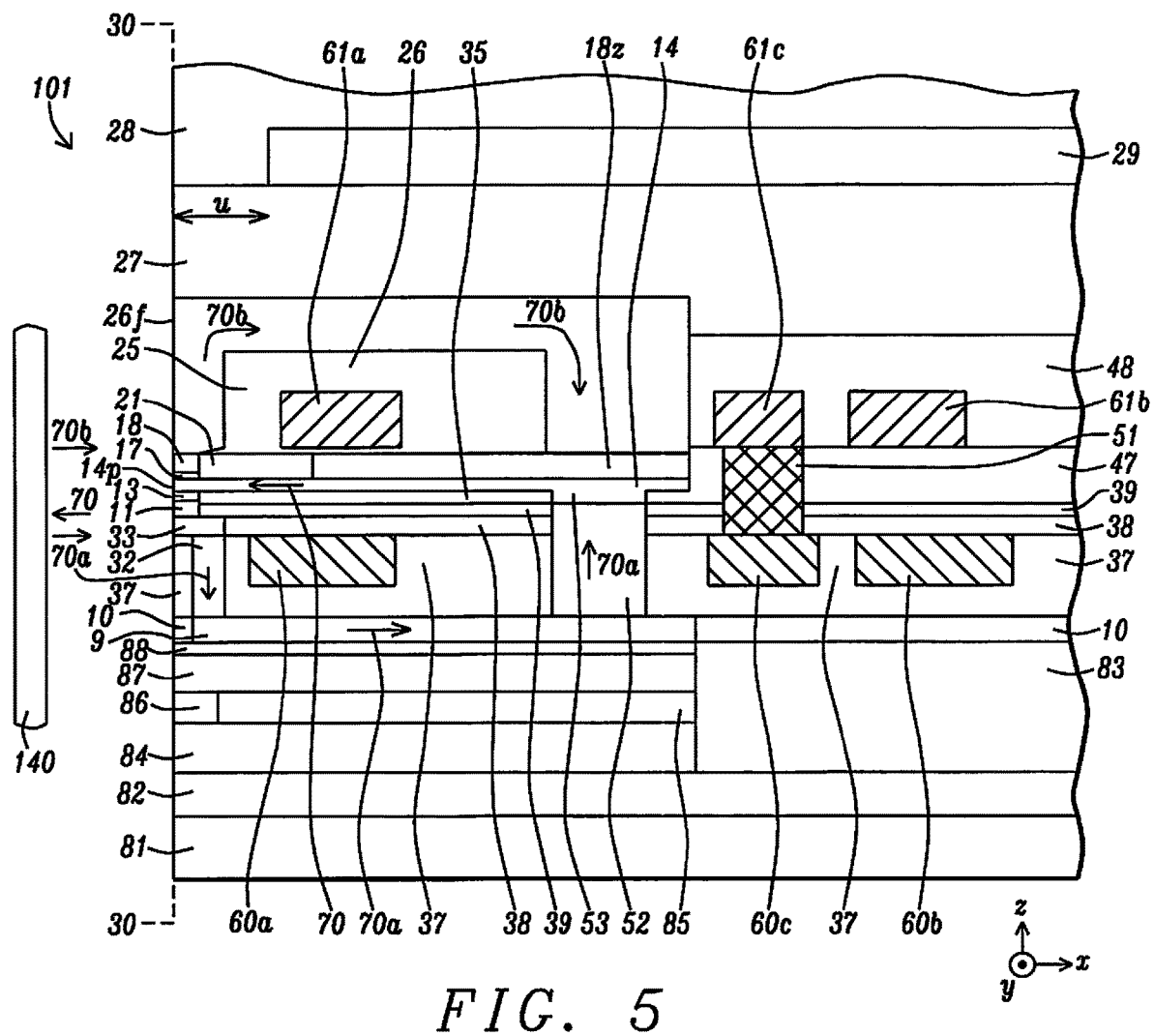
FIG. 5 is a down-track cross-sectional view of a combined read-write head with complete trailing and leading magnetic flux return loops according to an embodiment of the present disclosure.

Referring to FIG. 5, magnetic recording head 101 comprises a combined read-write head. The down-track cross-sectional view is taken along a center plane (44-44 in FIG. 16) formed orthogonal to the ABS 30-30, and that bisects MP 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a second top shield (S2B) layer 9 are sequentially formed on the top magnetic shield. Note that the S2B layer 9 may serve as a flux return path (RTP) in the write head portion of the combined read/write head. Thus, the portion of the combined read/write head structure formed below layer 9 in FIG. 5 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in MP 14 is generated with flowing a current through bucking coil 60a-c and driving coil 61a-c where front portions 60a and 61a are below and above the MP, respectively, center portions 60c and 61c are connected by interconnect 51, and back portions 60b and 61b are connected to writer pads (not shown). Magnetic flux 70 exits the MP at pole tip 14p at the ABS 30-30 and is used to write a plurality of bits on magnetic media 140. Magnetic flux 70b returns to the MP through a trailing loop comprised of a trailing shield structure including HS layer 17, WS 18, and uppermost trailing (PP3) shield 26, and top yoke 18x. There is also a leading loop with a recessed DWS (rDWS) BGC layout for magnetic flux 70a return to the MP where LSC 32 and RTP 9 are recessed from the ABS 30-30. The rDWS BGC design features leading shield (LS) 11, leading shield connector (LSC) 33, S2 connector (S2C) 32, return path (RTP) 9, lower back gap (LBG) 52, and back gap connection (BGC) 53. In another embodiment (not shown), only the LS is retained in the leading return loop in a so-called non-dual write shield (nDWS) scheme where the LSC, S2C, RTP, LBG, and BGC are omitted to enhance magnetic flux in the trailing loop. The magnetic core may also comprise a bottom yoke 35 below the MP.

Dielectric layers 10, 13, 21, 37-39, and 47-48 are employed as insulation layers around magnetic and electrical components. A protection layer 27 covers the PP3 shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Typically, a dynamic fly height (DFH) heater (not shown) is formed in one or more insulation (dielectric) layers in each of the read head and write head to control the extent of thermal expansion (protrusion) at the ABS and toward a magnetic medium during a read process and write process, respectively. Read gap (RG) and write gap (WG) protrusion may be tuned by the placement of the DFH heaters, and by the choice of metal or alloy selected for the DFH heaters since each DFH heater is comprised of a resistor material with a particular thermal and mechanical response to a given electrical input.

Figure 6:
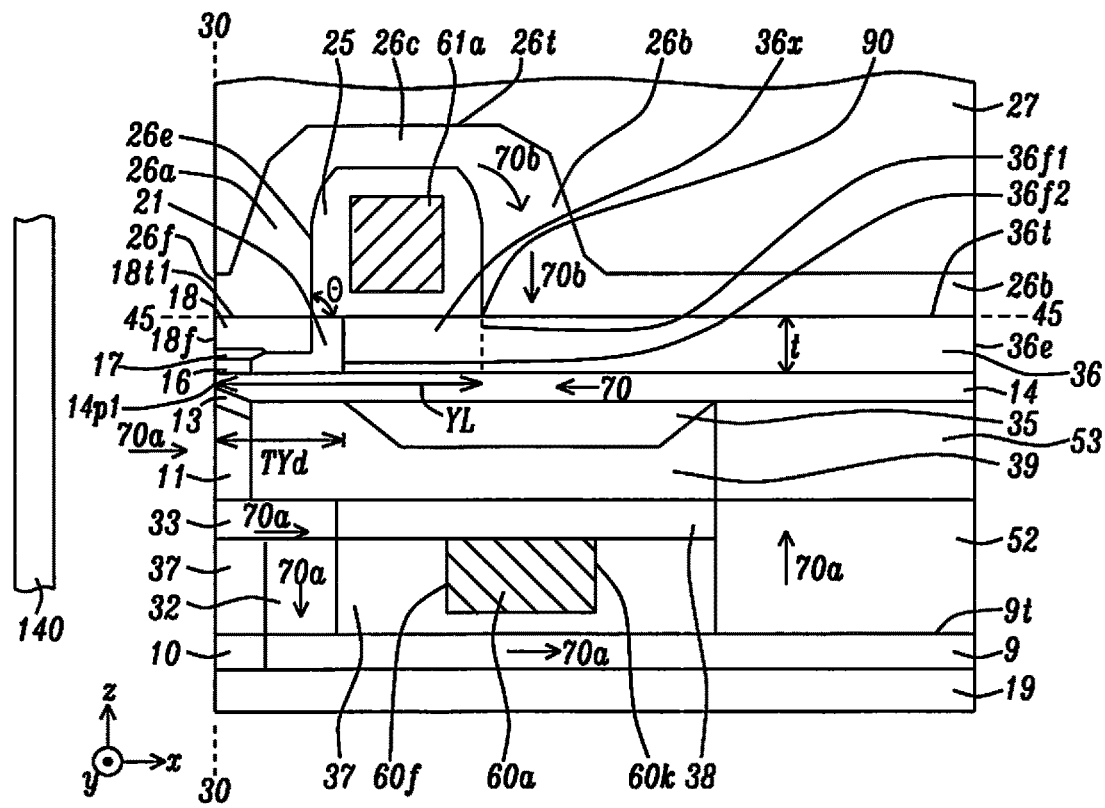
FIG. 6 is a down-track cross-sectional view of a PMR writer having a uDY design for the trailing loop and a rDWS BGC layout for the leading loop according to a scheme practiced by the inventors.
Figure 16:
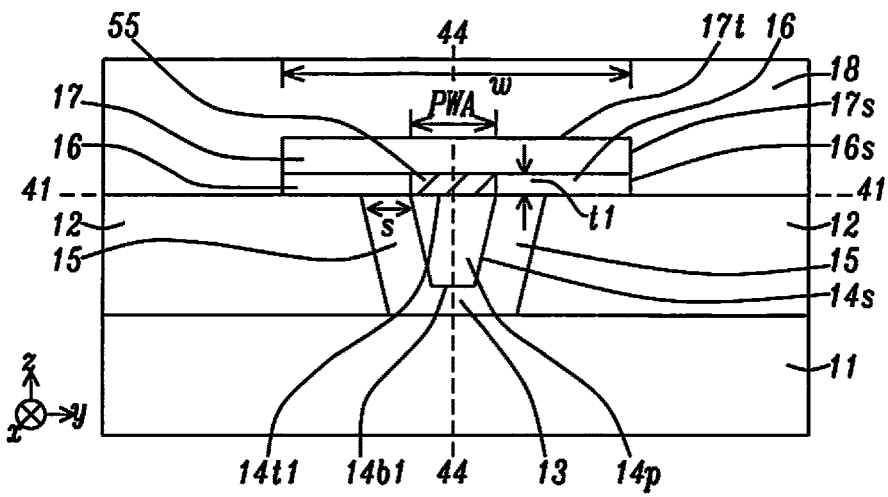
FIGS. 16-20 are ABS views depicting various embodiments where a NM metal layer is formed in one or both of the WG and side gaps to provide electrical contact between the MP tip and the HS layer and SS, respectively.

Referring to FIG. 6, an enlargement of a write head portion of a combined read-write head is shown according to a scheme practiced by the inventors, and is a down-track cross-sectional view taken along center plane 44-44 in FIG. 16, for example. A uDY rDWS BGC base writer design is shown where the trailing loop has an ultimate double yoke (uDY) scheme, and the leading loop has a rDWS BGC layout. Bucking coil front portion 60a has front side 60f that is recessed from the ABS 30-30, backside 60k facing LBG 52, and is formed in insulation layer 37 and above RTP top surface 9t. RTP 9 is formed on bottommost insulation layer 19. Leading shield (LS) 11 contacts a top surface of LS connector (LSC) 33 at the ABS. Insulation layer 38 adjoins a backside of the LSC and extends to a BGC front side. The leading loop for flux return 70a continues from the LS and LSC through S2C 32 and the RTP before passing upward through the lower back gap (LBG) 52 and BGC 53. The BGC contacts a bottom surface of MP 14 behind tapered bottom yoke (tBY) 35. Insulation layer 39 extends from the LS backside to the BGC front side, and contacts a top surface of insulation layer 38. The tBY 35 is formed within insulation layer 39, and between the LS and BGC.

The trailing loop comprises HS layer 17, WS 18 with front side 18f at the ABS 30-30, PP3 TS 26 that has front side 26f at the ABS, and TY 36 with top surface 36t adjoining the PP3 TS behind driving coil (DC) 61a so that magnetic flux 70b from magnetic medium 140 is able to return to MP 14. DC 61a is formed above insulation layer 21 and is surrounded on the sides and top and bottom surfaces with insulation layer 25. PP3 TS top surface 26t arches (dome shape) over DC front portion 61a. Protection layer 27 covers the PP3 TS and is made of an insulating material such as alumina. Note that the TY has a thickness t, and height d between a front side 36f1 and backside 36e where the front side is directly below the inner corner 90 of the PP3 TS where the PP3 TS contacts plane 45-45.

The uDY aspect of the trailing loop is related to the feature where the TY is comprised of a TY extension 36x having a front side 36f2 that is recessed a distance TYd of 0.8 to 1.3 microns from ABS 30-30, and a backside that interfaces with TY front side 36f1. Yoke length (YL) is defined as the distance between the ABS and TY front side 36f1. The TY extension has a thickness t of 0.3-0.8 microns, which is equal to that of TY 36. The PP3 TS has a middle portion 26c with a dome shaped top surface 26t formed above driving coil front portion 61a. A front portion 26a of the PP3 TS is formed on WS 18 and has an inner side 26e that forms an apex angle θ, preferably from 60 degrees to 80 degrees, with respect to plane 45-45 that comprises TY top surface 36t and is orthogonal to the ABS. A back portion 26b of the PP3 TS adjoins a top surface of TY 36. The PP3 TS apex angle is believed to enhance flux concentration at WS 18 and provides improved high data rate performance. A key feature is that TYd is less than YL. Driving coil front portion 61a is entirely above plane 45-45 and TY extension 36x, and within insulation layer 25.

Leading shield 11, LSB 33, S2C 32, LBG 52, BGC 53, and RTP 9 are generally made of NiFe, CoFe, CoFeN, CoFeNi or the like with a saturation magnetization (Ms) value of 4 kiloGauss (kG) to 16 kG. WS 18, PP3 TS 26a-26c, TY 36, and TY extension 36x are typically made of NiFe, CoFe, CoFeNi, or CoFeN having a Ms 10 kG to 19 kG while HS layer 17 and MP 14 have a Ms from 19 kG to 24 kG. In this scheme, the tBY 35 contacts a bottom surface of MP 14 below the TY extension. Although the PP3 TS 26a-c has a front side 26f at the ABS, the front side may be recessed from the ABS 30-30 in other embodiments (not shown).

Figure 7:
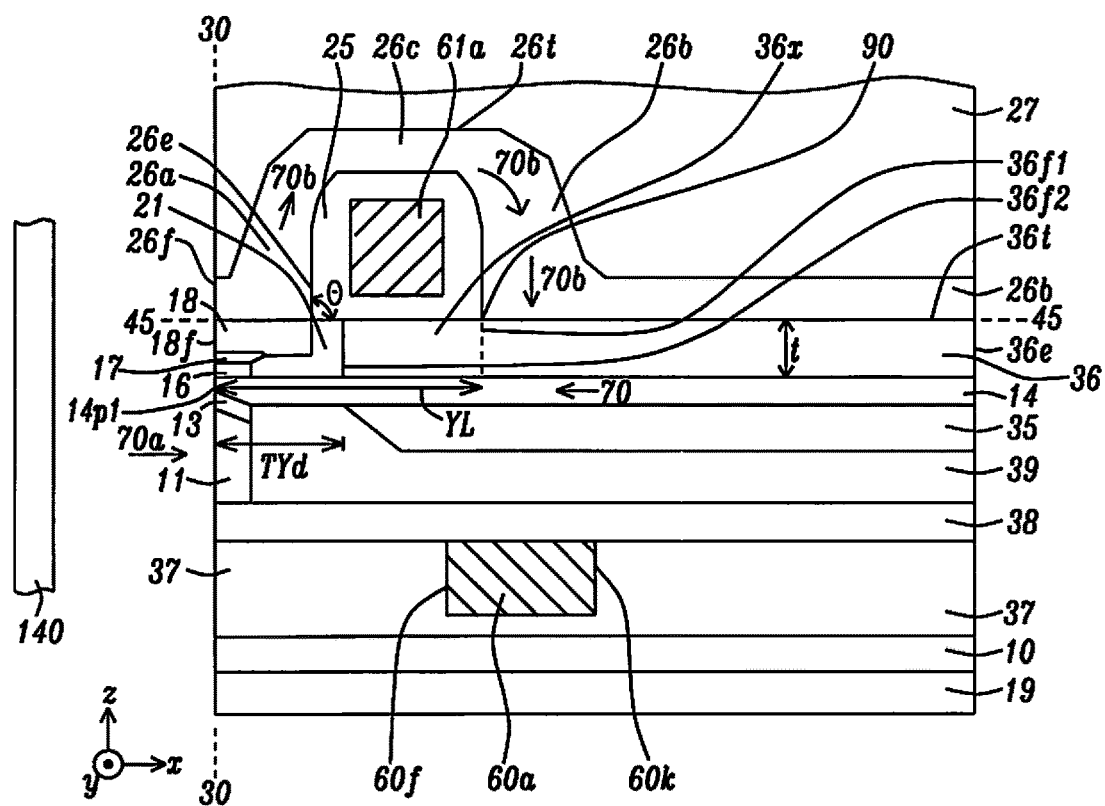
FIG. 7 is a down-track cross-sectional view of a PMR writer having a uDY design for the trailing loop and a nDWS layout for the leading loop according to a scheme practiced by the inventors.

FIG. 7 depicts a writer with a uDY trailing loop and a nDWS layout for the leading loop according to another writer scheme practiced by the inventors wherein the leading loop terminates at leading shield 11. The nDWS approach is beneficial in providing a better return field at the MP trailing edge thereby improving field gradient, BER, and ADC compared with the rDWS BGC layout but at the expense of a worse nearby ATE.

Figure 8:
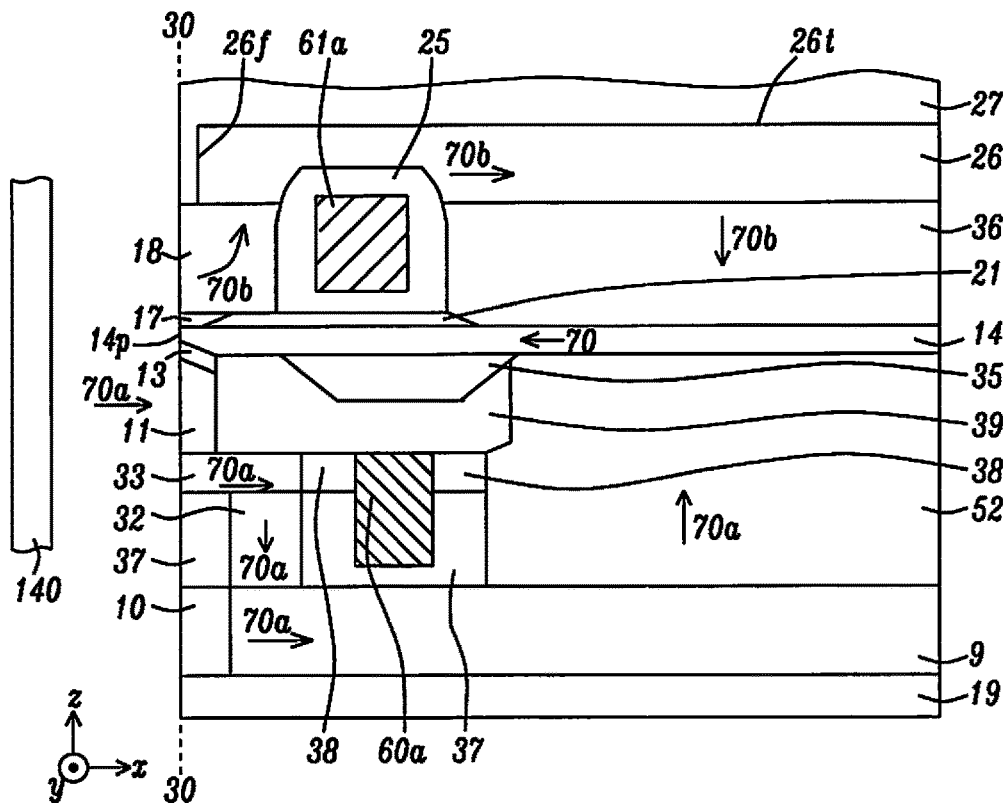
FIG. 8 is a down-track cross-sectional view of a PMR writer having an ePL design for the trailing loop and a rDWS BGC layout for the leading loop according to a scheme practiced by the inventors.

Referring to FIG. 8, another writer scheme is depicted that is known to the inventors and features an ePL trailing loop and a rDWS LBG leading loop. In this case, the LBG/BGC stack in the rDWS BGC layout described previously is replaced with LBG 52 that extends upward from RTP 9 to a back portion of MP 14. With the ePL scheme, the PP3 TS 26 in the trailing loop is modified to have a flat top surface 26t, and front side 26f is recessed from the ABS 30-30. However, in other embodiments (not shown) the PP3 TS front side may be at the ABS to satisfy thermo-magnetic requirements because of a larger metal area at the ABS. Moreover, an exposed PP3 TS front side at the ABS means fewer process steps and is preferred when wide adjacent track erasure (WATE) from the PP3 TS, and PP3 TS to WS 18 interface is manageable.

Figure 9:
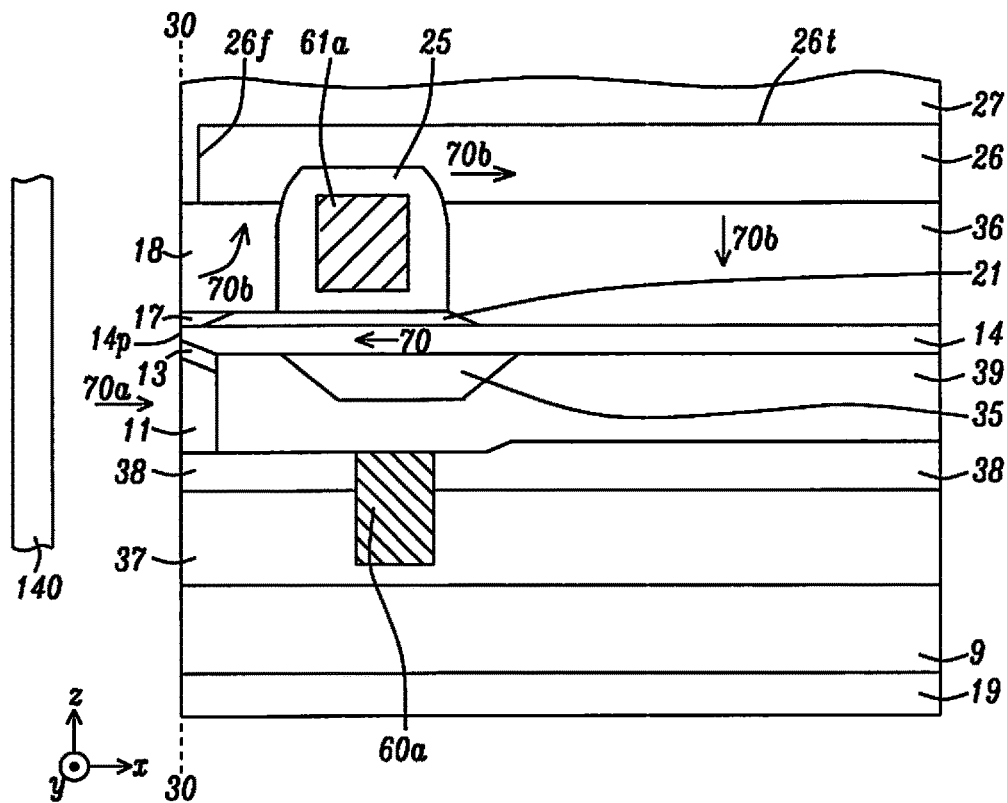
FIG. 9 is a down-track cross-sectional view of a PMR writer having an ePL design for the trailing loop and a nDWS layout for the leading loop according to a scheme practiced by the inventors.

Referring to FIG. 9, an ePL nDWS base writer structure known to the inventors is shown wherein the ePL design from FIG. 8 is retained, but the LSC 33, S2C 32, RTP 9, and LBG 52 are removed so that the leading loop terminates at LS 11. This scheme has the same advantage as the nDWS base structure in FIG. 7 in terms of a better return field at the MP trailing edge compared with the ePL rDWS LBG writer structure, but at the expense of a worse nearby ATE.

All of the writer structures shown in FIGS. 6-9 depict a single PMR writer. However, the present disclosure also anticipates a selectable dual PMR writer (SDW) or selectable triple PMR writer (STW) wherein only the better or best performing writer is selected for a write process. When two or more PMR writers (not shown) are formed on a slider, each writer may be fully separated from an adjacent writer with a separate PP3 TS 26a-26c, HS layer 17, WS 18, LS 11, LSB 33, S2C 32, RTP 9, LBG 52, and BGC 53 as well as having a separate MP 14, tBY 35, TY extension 36x, and TY 36. In another embodiment (not shown), the two or more writers may share a PP3 TS, HS layer, WS, LS, LSB, S2C, and RTP, but have separate LBG, BGC, tBY, TY extension, TY, and MP. In yet another embodiment, all magnetic components in the leading and trailing loops are shared except for the tBY, MP, TY extension, and TY.

Figure 10:
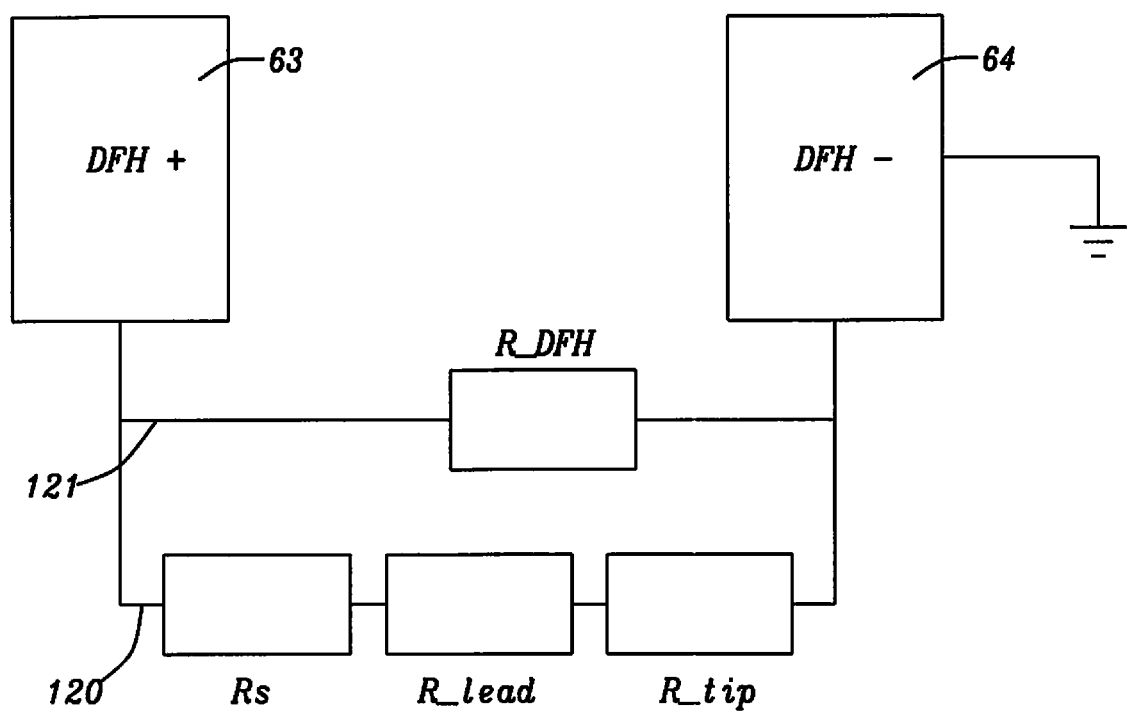
FIG. 10 is an equivalent electric circuit of a MP writer with a tunable MP tip protrusion design according to an embodiment of the present disclosure.

FIG. 10 shows an equivalent circuit of a PMR writer with tunable MP protrusion according to an embodiment of the present disclosure. Note that writer components except for the writer pads are omitted to more clearly show that circuit 121 comprising the MP tip runs parallel to the DFH heater circuit 120 where the latter has a total resistance (Rs+R_lead+R_tip) and the former has resistance R_DFH. A MP back portion is electrically connected to a built-in series resistor with resistance Rs, which is electrically connected to DFH (+) pad 63. R_lead accounts for the lead resistance contribution other than Rs and R_tip. Writer shields including the WS, SS, and LS are electrically connected to the DFH ground (−) pad 64. The MP tip is electrically connected to one or both of HS layer 17 and SS 12 through a NM metal layer as explained later with regard to FIGS. 16-20. MP tip resistance (R_tip) is tuned by adjusting the volume of NM metal in contact with the MP tip, as well as the NM metal composition. A key feature is that the tunable MP protrusion design of the present disclosure may be incorporated in a PMR writer without changing the existing pad layout in current products.

Figure 11:
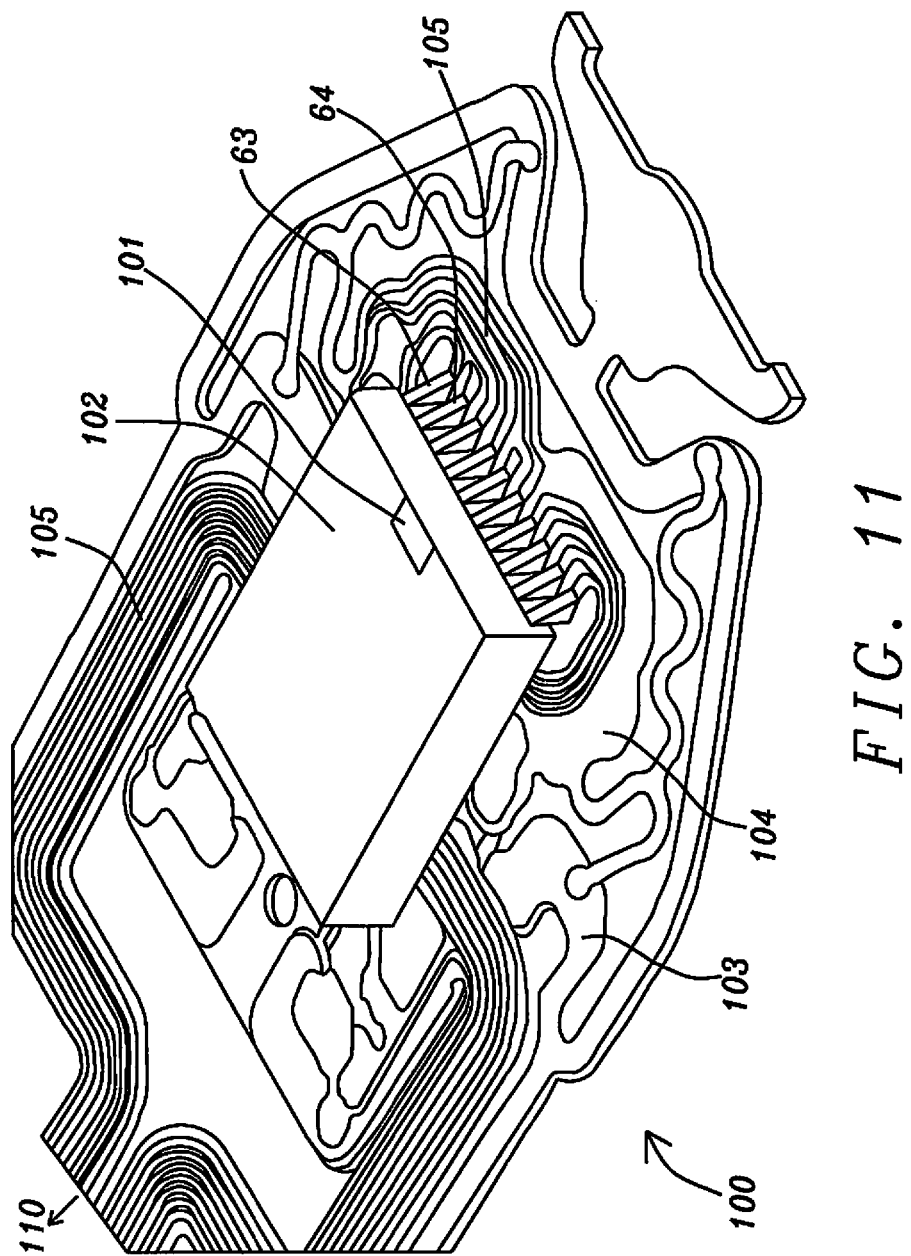
FIG. 11 is an oblique view of a slider on which a combined read/write head structure is mounted, and having adjoining pads and trace lines (wiring) formed on a suspension according to an embodiment of the present disclosure.
Figure 12:
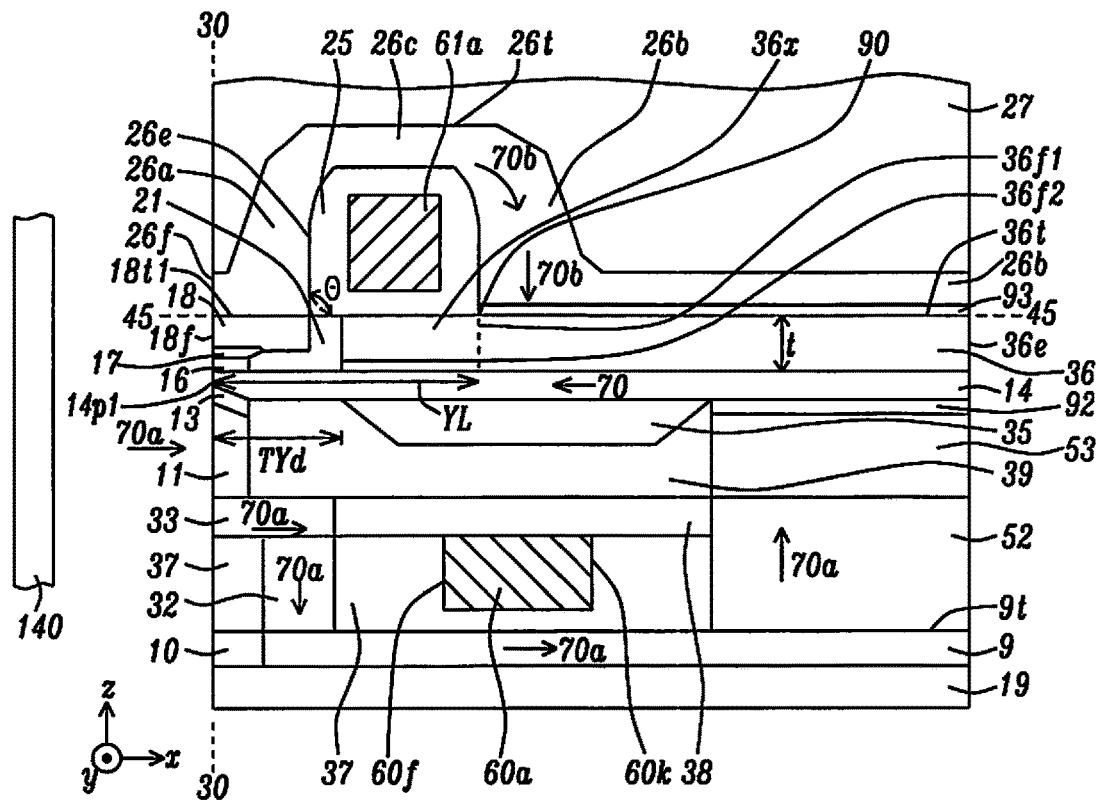
FIG. 12 is a down-track cross-sectional view where the writer in FIG. 6 is modified by adding a first insulation layer (IL) between the BGC and MP, and a second IL between the top yoke (TY) and PP3 shield to electrically isolate the MP back portion according to an embodiment of the present disclosure.

Referring to FIG. 11, HGA 100 is depicted and features suspension 103, an overlying dielectric layer 104, and slider 102 formed thereon. A combined read/write head 101 comprised of a PMR writer of the present disclosure adjoins a top side of the slider facing away from the suspension. The suspension is supported using an actuator arm that is driven by an actuation motor to sweep the suspension and slider across the surface of a recording disk as described previously with regard to FIG. 1. A plurality of writer pads including DFH pads 63, 64 are employed to control a current to the bucking coil, driving coil, and DFH writer heater while reader pads control current to the reader sensors, and DFH reader heater. Connections between the pads and the PMR writer components are within the slider and not visible from this view. The same fabrication scheme used to build a single writer may be employed to fabricate SDW or STW structures of the present disclosure so that no additional product cost is incurred.

In order to form a current path through the MP tip, one or two insulation layers are added to existing writer structures to give the embodiments illustrated in FIGS. 12-15. According to a first embodiment of the present disclosure depicted in FIG. 12, the uDY rDWS BGC base writer in FIG. 6 is modified by including a first insulation layer 92 behind the tBY 35, and between BGC 53 and a back portion of MP 14 to electrically isolate the MP back portion from the leading loop. Moreover, a second insulation layer 93 is formed behind PP3 TS inner corner 90 and between the top yoke 36 and PP3 TS back portion 26b to electrically isolate the MP back portion from the trailing loop. Both of the first and second insulation layers have a thickness of 10 nm to 300 nm with a nominal value around 100 nm and are made of one or more layers of metal oxide including but not limited to AlOx, SiOx, TaOx, and TiOx, and other metal oxides used in the art.

Figure 13:
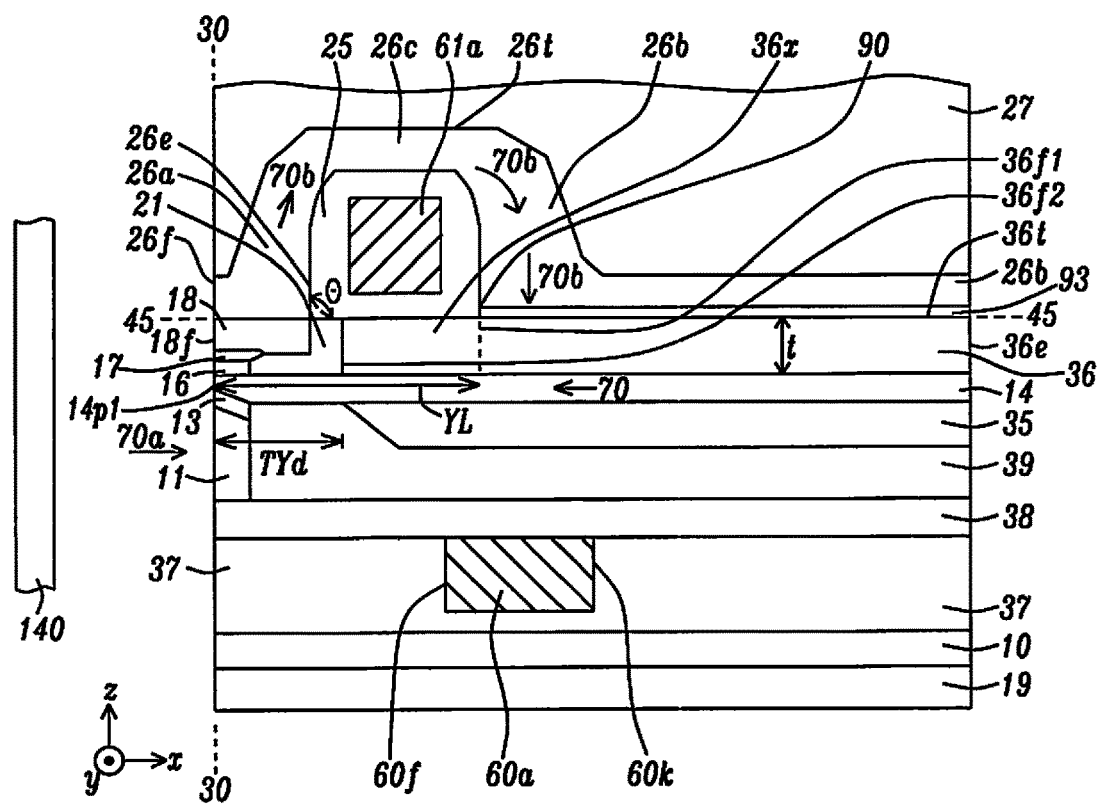
FIG. 13 is a down-track cross-sectional view where the uDY nDWS writer in FIG. 7 is modified by adding an insulation layer between the TY and PP3 shield to electrically isolate the MP back portion from the trailing loop according to an embodiment of the present disclosure.

A second embodiment of the present disclosure is shown in FIG. 13 and is a modification of the uDY nDWS base writer structure in FIG. 7 where insulation layer 93 described previously is formed on TY 36 at plane 45-45 and behind PP3 TS inner corner 90. Thus, the insulation layer separates the PP3 TS back portion 26b from the TY and electrically isolates the MP back portion from the trailing loop.

Figure 14:
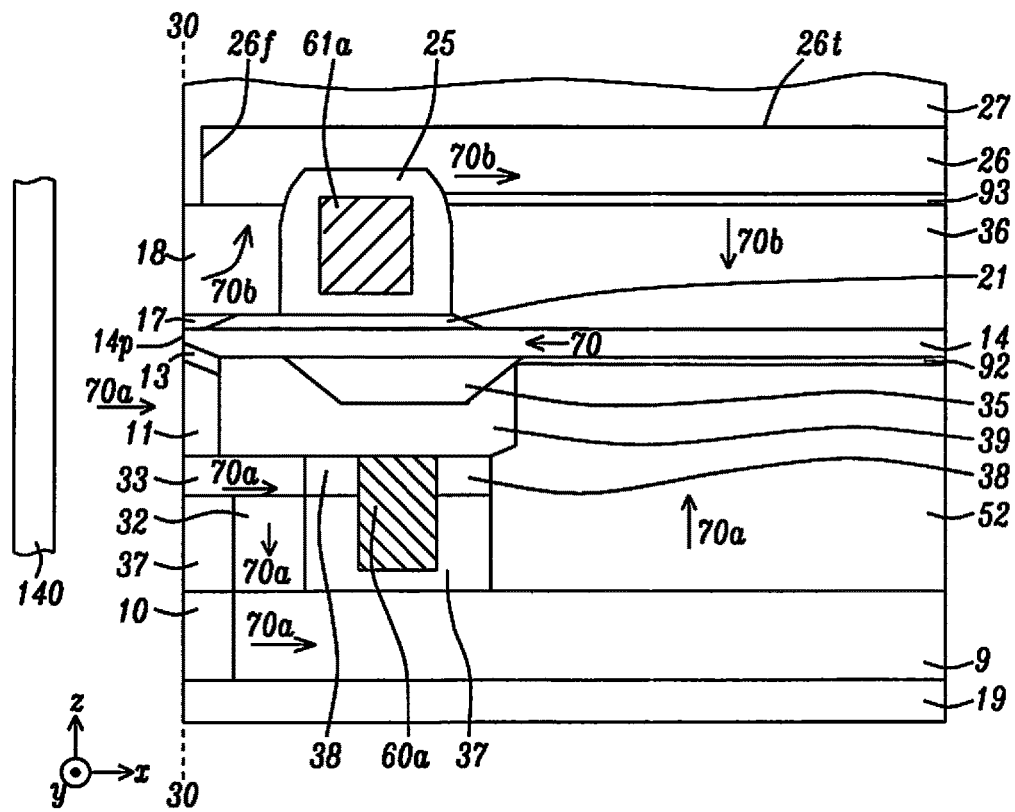
FIG. 14 is a down-track cross-sectional view where the ePL rDWS writer in FIG. 8 is modified by adding a first IL between the BGC and MP, and a second IL between the TY and PP3 shield to electrically isolate the MP back portion from the leading and trailing loops according to an embodiment of the present disclosure.

According to a third embodiment of the present disclosure depicted in FIG. 14, the ePL rDWS LBG base writer in FIG. 8 is modified to include first insulation layer 92 between LBG 52 and a back portion of MP 14 to electrically isolate the MP back portion from the leading loop. Furthermore, second insulation layer 93 is formed on TY 36 and adjoins a bottom surface of PP3 TS 26 behind driving coil front portion 61a so that the MP back portion is electrically isolated from the trailing loop. Depending on the thickness of the insulation layers, some magnetic flux 70a and 70b in the leading loop and trailing loop, respectively, may leak into the MP.

Figure 15:
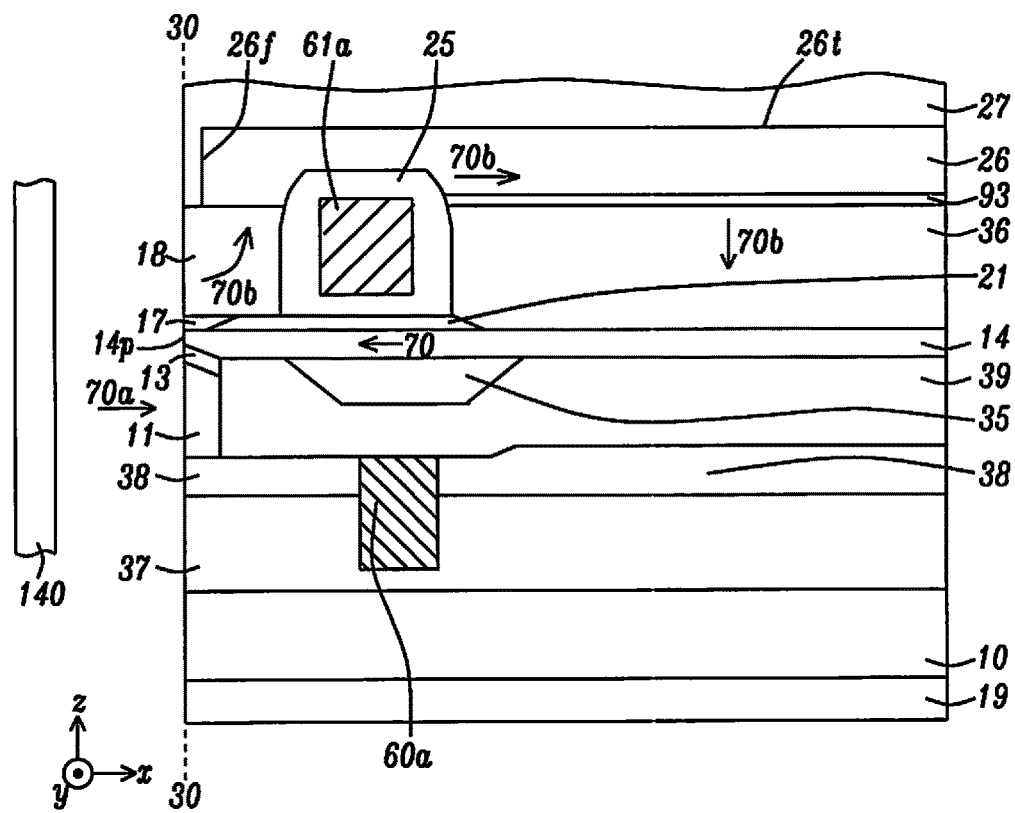
FIG. 15 is a down-track cross-sectional view where the ePL nDWS writer in FIG. 9 is modified by adding an insulation layer between the TY and PP3 shield to isolate the MP back portion from the trailing loop according to an embodiment of the present disclosure.

Referring to FIG. 15, a fourth embodiment of the present disclosure is shown where the ePL nDWS base writer in FIG. 9 is modified to insert insulation layer 93 on TY 36 and adjoining a bottom surface of PP3 TS 26. As a result, a back portion of MP 14 is electrically isolated from the trailing loop.

FIGS. 16-20 illustrate various embodiments of the present disclosure from an ABS view of the MP tip and surrounding shield structure. It should be understood that each of the embodiments in FIGS. 16-20 may be incorporated in any of the writer schemes described previously with regard to FIGS. 12-15. In particular, R_tip, and therefore MP tip protrusion, is tuned in the various embodiments based on the volume of NM metal contacting the MP tip, and the NM metal composition. R_tip is expected to have the least dependency on MP PWA and MP dimensions when the conducting path width in the WG is narrower than PWA and independent of PWA. As R_tip increases, MP protrusion is enhanced.

Referring to FIG. 16, one embodiment of an electrical connection between MP tip 14p and the surrounding shield structure is depicted. First NM metal layer 55 is formed in the WG, has thickness t1 of 15 nm to 22 nm, and extends from the ABS to a height of 20 nm to 60 nm. The first NM metal layer preferably has a width no more than PWA+2s where s is the SG width, and makes a contact between HS 17 and MP tip 14p without touching side shield 12 when SG 15 is not a NM metal layer. The first NM metal layer is a single layer or multilayer comprised of one or more of Ru, NiCr, Ta, Cu, W, Ti, or other conductive materials used in the art. Center plane 44-44 bisects the MP trailing side 14t1 and MP leading side 14b1. MP side 14s adjoins a side gap 15 on each side of the center plane. Leading gap 13 is between the MP leading side and LS 11. HS layer 17 has a width w that is bisected by the center plane, and contacts a top surface of first NM metal layer 55 and a top surface of WG 16 on each side of the first NM metal layer. Note that WG side 16s is self-aligned to HS layer side 17s on each side of the center plane. Plane 41-41 comprises the MP trailing side at the ABS, and forms the interface between WG 16 and side shields (SS) 12, and between write shield (WS) 18 and each SS. The WS contacts WG sides 16s as well as HS layer top surface 17t and sides 17s. Thus, the MP tip has an electrical connection to the HS layer while the MP back portion is electrically insulated from the trailing loop.

Figure 17:
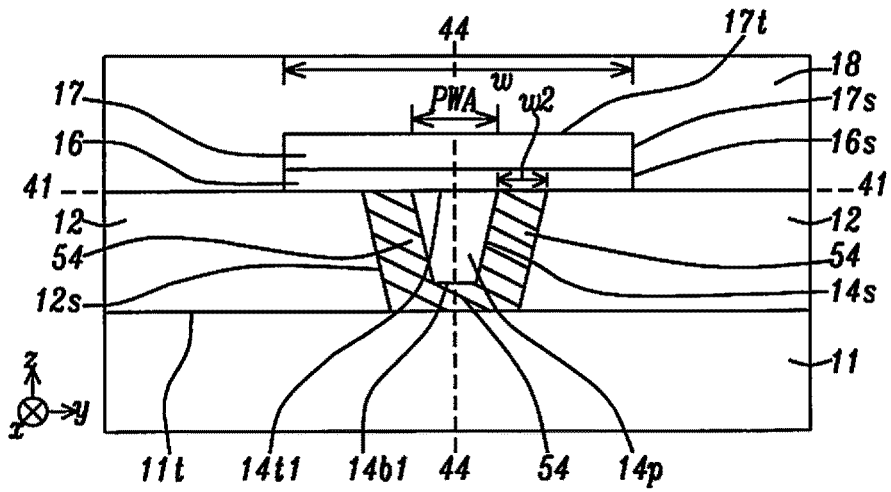

In FIG. 17, a second embodiment of an electrical connection between MP tip 14p and the surrounding shield structure is illustrated. The first NM metal layer in the WG of the first embodiment is removed so that WG 16 has width w and separates MP trailing side 14t1 from HS layer 17. However, a second NM metal layer 54 is formed in the leading gap, and in each side gap between SS inner side 12s and MP side 14s so that the MP tip is electrically connected to a top surface 11t of LS 11, and each SS 12, respectively. The second NM metal layer may be a single layer or multilayer and is comprised of one or more materials mentioned previously with respect to the first NM layer. Second NM metal layer width in the SG is typically from 20 nm to 60 nm. One advantage of the second embodiment is to enhance MP protrusion with less HS layer protrusion to avoid reliability issues from excessive HS layer protrusion (wear).

Figure 18:
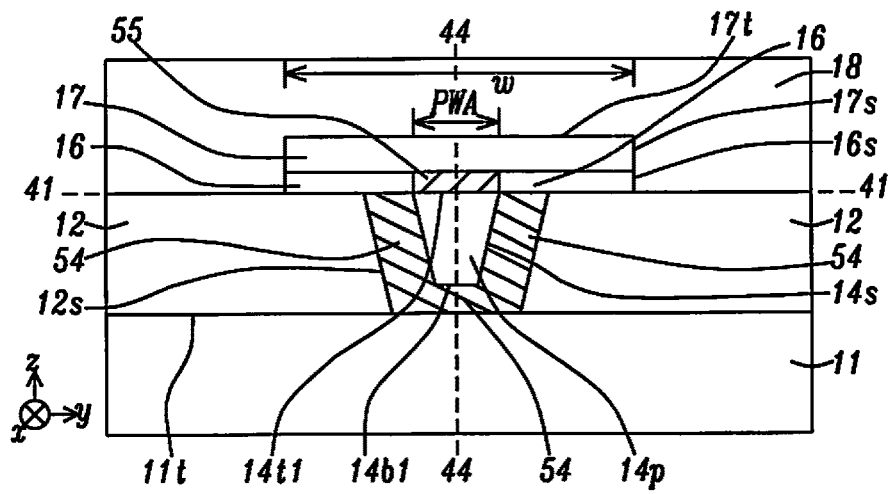

According to a third embodiment of an electrical connection between MP tip 14p and the surrounding shield structure shown in FIG. 18, the first embodiment where first NM metal layer 55 is formed in the WG between MP trailing side 14t1 and HS layer 17 is modified to include the second NM metal layer 54 in the side gaps and leading gap as described previously in the second embodiment.

Figure 19:
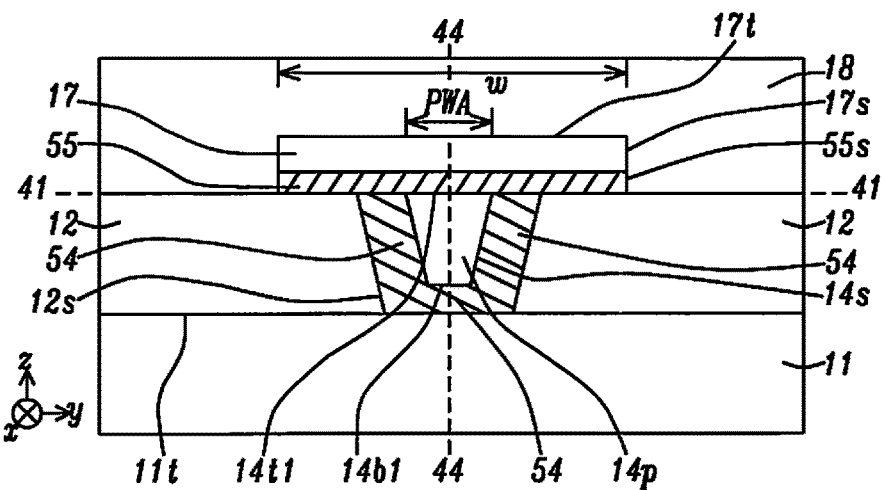

Referring to FIG. 19, a fourth embodiment of an electrical connection between MP tip 14p and the surrounding shields is shown where the third embodiment is modified to widen the first NM metal layer 55 to have width w so that first NM metal layer side 55s on each side of center plane 44-44 is self-aligned (coplanar) with HS layer side 17s.

Figure 20:
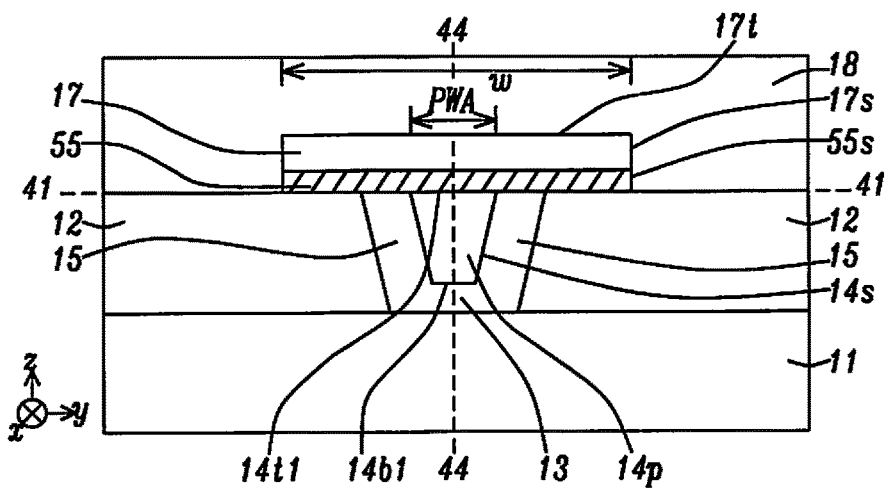

A fifth embodiment of the present disclosure that relates to an electrical connection between MP tip 14p and surrounding shields is depicted in FIG. 20. In particular, the first embodiment in FIG. 16 is modified to widen the first NM metal layer 55 to have width w so that first NM metal layer side 55s on each side of center plane 44-44 is coplanar with HS layer side 17s. R_tip for the third embodiment in FIG. 18 is expected to be lower than that of the first two embodiments while R_tip for the fourth embodiment is expected to be the lowest of all assuming the composition for NM metal layers 54, 55, and the width and height of the NM metal layers are constant in each embodiment.

Figure 21:
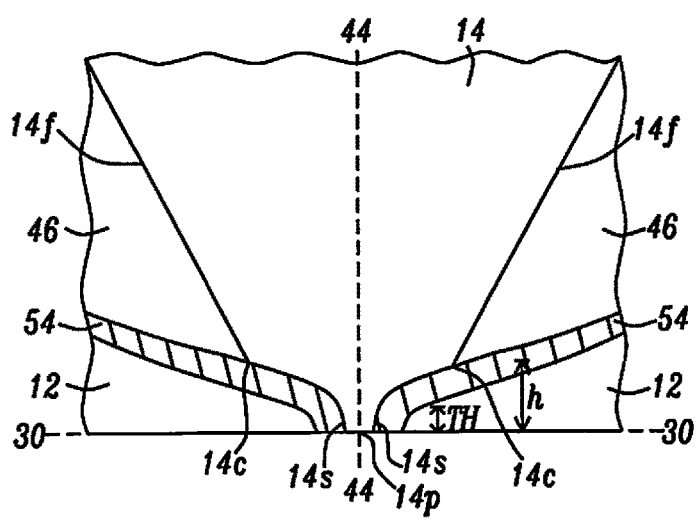
FIG. 21 is a top-down view of an embodiment where a NM metal layer is formed in each side gap between the MP and a side shield (SS) and extends from the ABS to a far side of each SS.

FIG. 21 illustrates a top-down view of any of the second through fourth embodiments (FIGS. 17-19) where all PMR writer layers above MP 14 and side shields 12 are removed to clearly reveal second NM metal layer 54 on each side of center plane 44-44. The second NM metal layer adjoins each MP tip side 14s from the ABS 30-30 to a throat height (TH) of about 50 nm to 120 nm, has a width of 20 nm to 60 nm, and then slopes away from the center plane with increasing separation from the center plane as the second NM metal layer height from the ABS increases. Each MP tip side connects with curved MP side 14c, which in turn connects with MP flared side 14f at height h from the ABS. Insulation layer 46 separates each MP flared side from the second NM metal layer.

Figure 22:
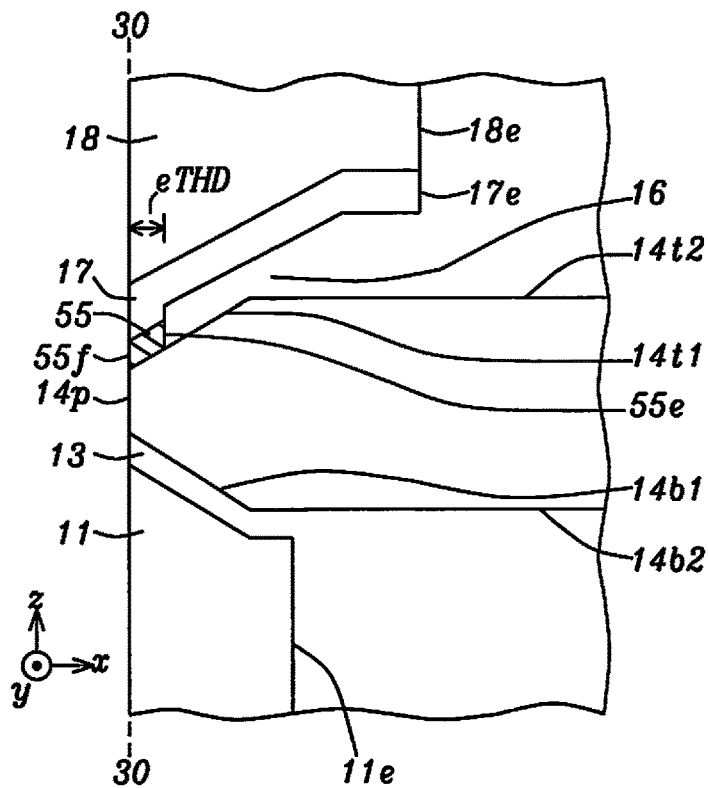
FIGS. 22-23 are down-track cross-sectional views where a NM metal layer in the WG is at the ABS and recessed from the ABS, respectively, according to embodiments of the present disclosure.

Referring to FIG. 22, a down-track cross-sectional view at center plane 44-44 is shown for any of the first embodiment (FIG. 16) and third through fifth embodiments (FIGS. 18-20) where first NM metal layer 55 is formed in the WG between MP trailing side 14t1 and HS layer 17. According to one embodiment, the first NM metal layer has a front side 55f at the ABS 30-30 and extends to a backside 55e at a height of 20 nm to 60 nm and proximate to HS layer tip height eTHd. LS 11 has backside 11e while HS layer and WS 18 have backsides 17e and 18e, respectively, that are typically substantially greater than eTHd. Note that eTHd is relatively small compared with other device dimensions mentioned earlier such as width w, and heights TYd and YL, and is therefore sensitive to lapping control, which means that R_tip may have substantial device to device variation.

Figure 23:
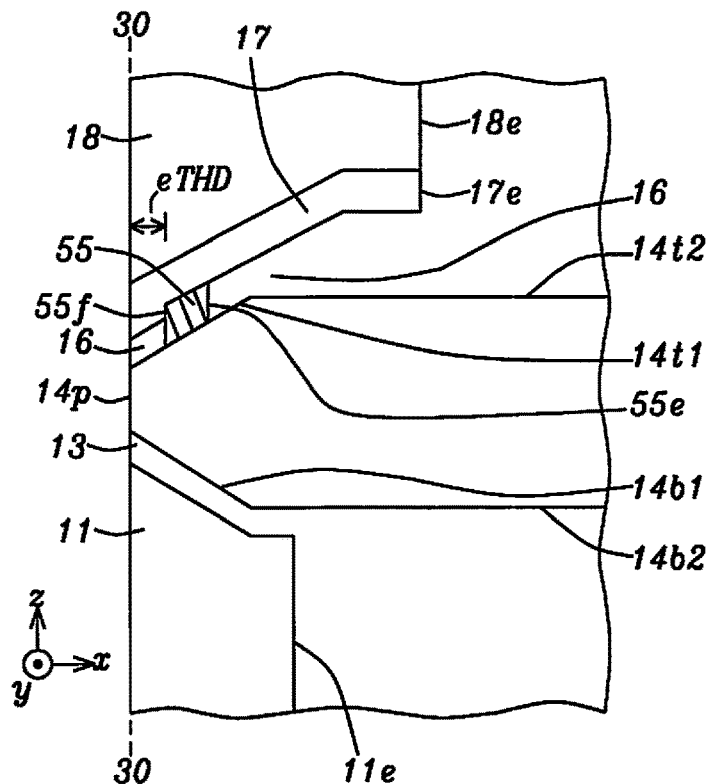

As depicted in FIG. 23, the present disclosure also anticipates that first NM layer 55 may be in the WG but front side 55f is recessed 50 nm to 100 nm from the ABS 30-30. In this embodiment, there is more reproducibility in providing the desired first NM metal layer width and height (volume) and a desired R_tip resistance value than when front side is exposed at the ABS and is subject to variations in the lapping process.

Tables 1-2 show experimental results of PMR heads built according to an embodiment of the present disclosure where the writer has an ABS view according to the first embodiment in FIG. 16, and a down-track cross-sectional view as shown in FIG. 22 where the first NM metal layer 55 is at the ABS 30-30. Results are shown with bias off (voltage across MP tip region=V_tip=0) and with bias on where V_tip=100 mV. Two pads (not shown) are added to form an electric circuit from the writer shields to the MP, and apply direct current (DC) current near the MP tip. Special preamp and suspension are required to accommodate the pad layout change and the additional bias application in spin stand testing and HDD application. With bias on, erase width (EW) is increased by an average of about 1 nm, and ADC improvement from kFCI is found to be ~0.5% if all samples are included with a wide range of EW from 37 nm to 70 nm (average EW=52 nm) as in Table 1. ADC improvement is ~1% for narrow EW from 38 nm to 48 nm (average EW=44) in Table 2.

For all heads, overwrite (OW2), low frequency writeability quantified by 15T overwrite 2T, shows no change while bit error rate (BER) and center track bit error rate after squeeze (SqBER) are improved by 0.05 and 0.03 decade, respectively between bias on and bias off. For the aforementioned narrow EW heads, OW2 gain is about 0.5 dB at bias on while writer heater touchdown (TD) spacing is significantly reduced by ~0.1 nm. Meanwhile, IwPTP shows a consistent 0.07 nm increase suggesting more writer protrusion near MP region with current passing through the MP tip at bias on. Experimental results support that passing a current through the MP tip region will improve MP protrusion, and also improve ADC, especially for narrow EW and heads with a narrow PWA of less than 50 nm. Subsequently, we found that the existing PMR pad layout may be employed so that the existing PMR preamp and suspension are applied transparently without any additional cost to the backend process and HDD applications.

TABLE 1

Exp. results of PMR heads (size 36) with PMR bias off V_tip = 0 vs. bias on V_tip = 100 mV

| All parts (EW 37-70 nm) | RHTD power (mW) | RHTD spacing (nm) | WH TD power (mW) | WH TD spacing (nm) | IwPTP (nm) | EW (nm) | ADC | kTPI | kFCI | BER | SqBER | OW2 (dB) |
|---|---|---|---|---|---|---|---|---|---|---|---|---|
| Bias off 0 mV | 63.2 | −11.09 | 59.13 | −7.43 | 0.37 | 51.65 | 938.8 | 448 | 2114.5 | −2.53 | −2.13 | 26.51 |
| Bias on 100 mV | 63.1 | −11.07 | 58.08 | −7.33 | 0.44 | 52.60 | 943.4 | 445 | 2137.1 | −2.58 | −2.16 | 26.56 |
| Bias on-off delta | −0.10 | 0.03 | −1.05 | 0.10 | 0.07 | 0.95 | 4.7 | −3.0 | 22.6 | −0.05 | −0.03 | 0.05 |

TABLE 2

Exp. results of PMR heads (size 14) with PMR bias off V_tip = 0 vs. bias on V_tip = 100 mV

| Selected (EW 38-48 nm) | RHTD power (mW) | RHTD spacing (nm) | WH TD power (mW) | WH TD spacing (nm) | IwPTP (nm) | EW (nm) | ADC | kTPI | kFCI | BER | SqBER | OW2 (dB) |
|---|---|---|---|---|---|---|---|---|---|---|---|---|
| Bias off 0 mV | 64.38 | −11.48 | 59.21 | −7.63 | 0.42 | 43.51 | 958.1 | 492.0 | 1952.1 | −2.10 | −2.01 | 20.58 |

TABLE 2-continued

Exp. results of PMR heads (size 14) with PMR bias off V_tip = 0 vs. bias on V_tip = 100 mV

| Selected (EW 38-48 nm) | RHTD power (mW) | RHTD spacing (nm) | WH TD power (mW) | WH TD spacing (nm) | IwPTP (nm) | EW (nm) | ADC | kTPI | kFCI | BER | SqBER | OW2 (dB) |
|---|---|---|---|---|---|---|---|---|---|---|---|---|
| Bias on 100 mV | 64.74 | −11.48 | 58.55 | −7.52 | 0.49 | 44.75 | 968.1 | 489.2 | 1981.4 | −2.15 | −2.06 | 21.07 |
| Bias on-off delta | 0.36 | 0.00 | −0.66 | 0.11 | 0.07 | 1.24 | 9.9 | −2.8 | 29.3 | −0.05 | −0.05 | 0.49 |

TABLE 3

Practical examples of tunable MP protrusion design

| Case #1 | R_DFH | 80 Ohm | P_DFH | 60 mW | V_DFH | 2.19 Volt |
|---|---|---|---|---|---|---|
| | R_tip | 15 Ohm | P_tip | 0.33 mW | V_tip | 0.07 Volt |
| | R_lead | 15 Ohm | P_lead | 0.33 mW | V_lead | 0.07 Volt |
| | Rs | 439 Ohm | Ps | 9.57 mW | Vs | 2.05 Volt |
| | R_total | 68 Ohm | P_total | 70.22 mW | V_total | 2.19 Volt |
| Case #2 | R_DFH | 80 Ohm | P_DFH | 60 mW | V_DFH | 2.19 Volt |
| | R_tip | 15 Ohm | P_tip | 0.67 mW | V_tip | 0.10 Volt |
| | R_lead | 15 Ohm | P_lead | 0.67 mW | V_lead | 0.10 Volt |
| | Rs | 299 Ohm | Ps | 13.27 mW | Vs | 1.99 Volt |
| | R_total | 64 Ohm | P_total | 74.61 mW | V_total | 2.19 Volt |
| Case #3 | R_DFH | 80 Ohm | P_DFH | 60 mW | V_DFH | 2.19 Volt |
| | R_tip | 10 Ohm | P_tip | 0.49 mW | V_tip | 0.07 Volt |
| | R_lead | 15 Ohm | P_lead | 0.74 mW | V_lead | 0.11 Volt |
| | Rs | 288 Ohm | Ps | 14.11 mW | Vs | 2.02 Volt |
| | R_total | 64 Ohm | P_total | 75.34 mW | V_total | 2.19 Volt |
| Case #4 | R_DFH | 95 Ohm | P_DFH | 60 mW | V_DFH | 2.39 Volt |
| | R_tip | 15 Ohm | P_tip | 0.33 mW | V_tip | 0.07 Volt |
| | R_lead | 15 Ohm | P_lead | 0.33 mW | V_lead | 0.07 Volt |
| | Rs | 482 Ohm | Ps | 10.49 mW | Vs | 2.25 Volt |
| | R_total | 80 Ohm | P_total | 71.14 mW | V_total | 2.39 Volt |
| Case #5 | R_DFH | 80 Ohm | P_DFH | 60 mW | V_DFH | 2.191 Volt |
| | R_tip | 14 Ohm | P_tip | 0.31 mW | V_tip | 0.066 Volt |
| | R_lead | 15 Ohm | P_lead | 0.33 mW | V_lead | 0.070 Volt |
| | Rs | 439 Ohm | Ps | 9.62 mW | Vs | 2.055 Volt |
| | R_total | 68 Ohm | P_total | 70.26 mW | V_total | 2.191 Volt |
| Case #6 | R_DFH | 80 Ohm | P_DFH | 60 mW | V_DFH | 2.191 Volt |
| | R_tip | 16 Ohm | P_tip | 0.35 mW | V_tip | 0.075 Volt |
| | R_lead | 15 Ohm | P_lead | 0.33 mW | V_lead | 0.070 Volt |
| | Rs | 439 Ohm | Ps | 9.54 mW | Vs | 2.046 Volt |
| | R_total | 68 Ohm | P_total | 70.21 mW | V_total | 2.191 Volt |

Table 3 provides a few practical examples to illustrate the TPP design concept of the present disclosure. Assumptions are that a typical writer DFH heater at operation has power consumption P_DFH~60 mW and the R_lead is ~15 ohm. Case #1 has R_DFH=80 ohm and R_tip=15 ohm. If V_tip needs to be controlled at about 70 mV, the series resistance Rs~439 ohm is required. Power consumption at the MP tip (P_tip) is ~0.33 mW. If V_tip needs to be controlled around 100 mV, as shown in Case #2, Rs ~299 ohm is required and P_tip is about doubled at 0.67 mW. Case #3 assumes the R_tip is ~10 ohm. To reach the same V_tip of 70 mV, Rs may be designed at 288 ohm and P_tip can reach 0.49 mW. If R_total is forced to be 80 ohm as shown in Case #4, R_DFH and Rs may be set at 95 ohm and 482 ohm, respectively. Assuming Case #1 is the nominal case and Rs is built at 439 ohm in the wafer, R_tip is 14 ohm in Case #5 and 16 ohm in Case #6. With the variation of R_tip, V_tip and P_tip vary change accordingly. Higher P_tip has higher power consumption at MP tip and higher MP tip protrusion.

Figure 24:
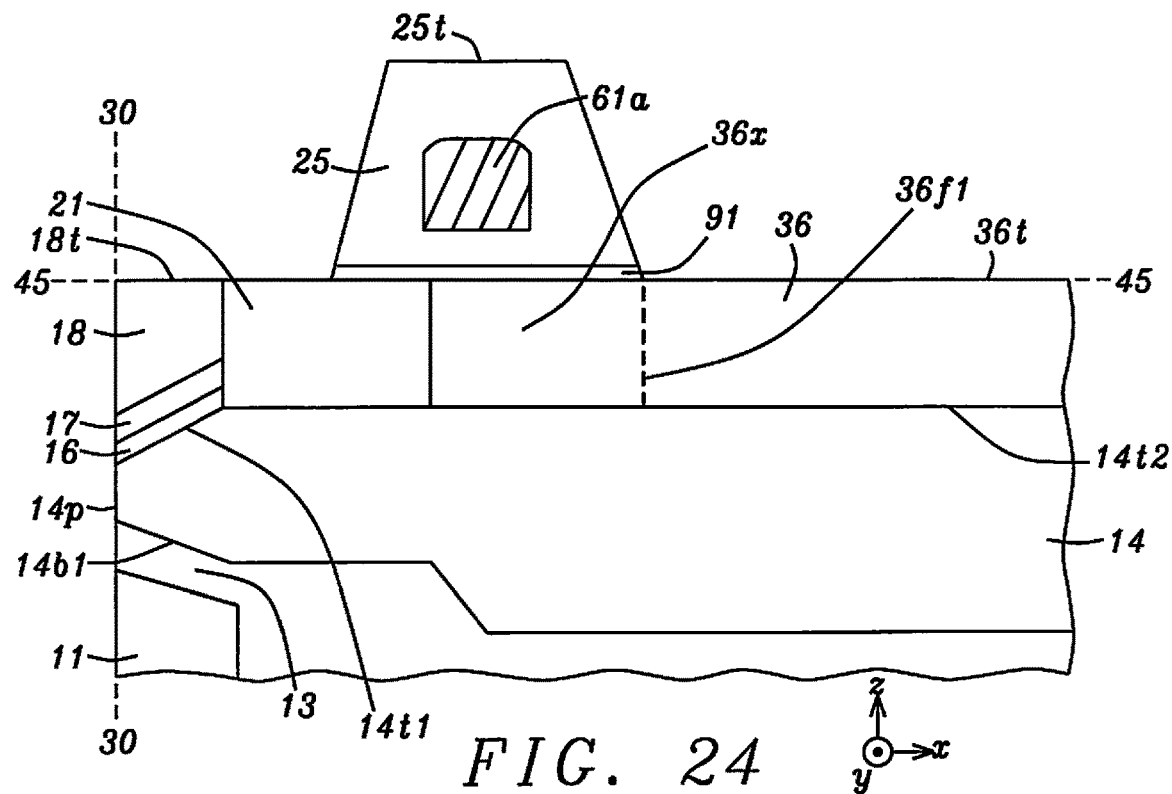
FIGS. 24-26 are down-track cross-sectional views showing a sequence of steps for forming a photoresist mask above the WS and driving coil, depositing an insulation layer above the top yoke, and then plating the PP3 shield on the WS and insulation layer according to an embodiment of the present disclosure.
Figure 25:
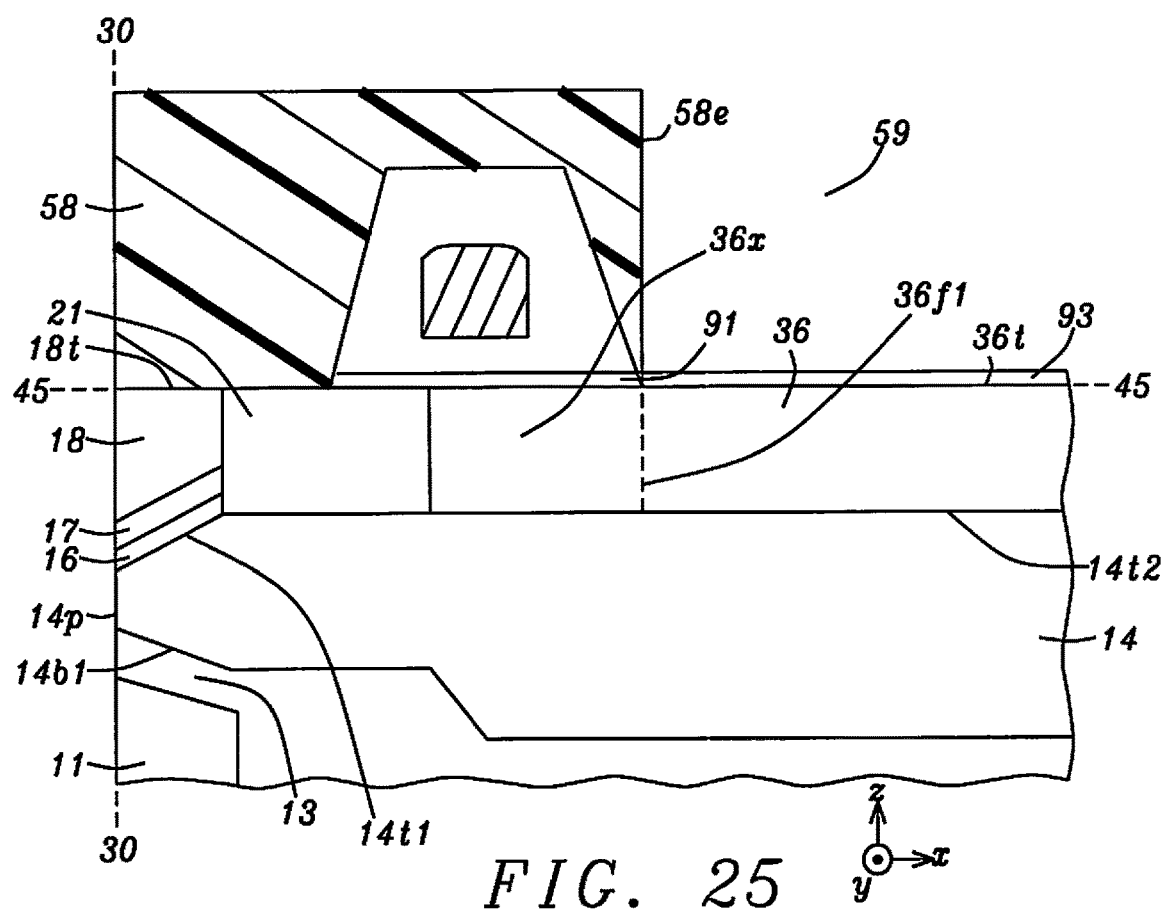
Figure 26:
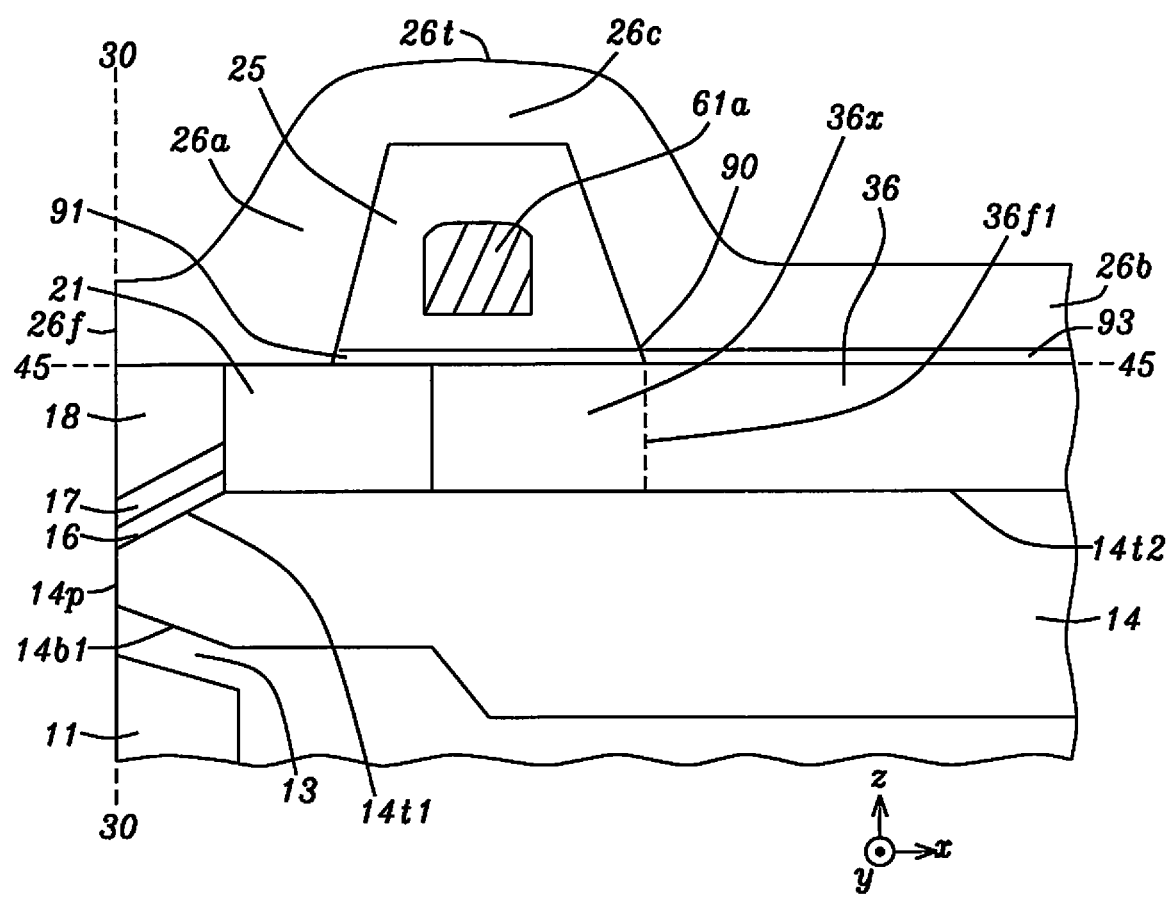

A key sequence in the fabrication process of a PMR writer having a tunable MP protrusion (TPP) design and a uDY layout in the trailing loop according to the present disclosure is depicted in FIGS. 24-26. It should be understood that a similar fabrication method was described in related U.S. Pat. No. 10,643,640. In particular, the current process sequence starts at FIG. 24 (also FIG. 24 in the related patent) where insulation layer 25 is patterned over driving coil front portion 61a and uncovers WS top surface 18t at the ABS 30-30, and TY top surface 36t at plane 45-45.

Referring to FIG. 25, a photoresist mask 58 with backside 58e is formed on insulation layers 21, 25, and on WS 18. Opening 59 behind the photoresist mask backside exposes TY top surface 36t. Next, second insulation layer 93 is deposited on the TY top surface and behind photoresist mask backside 58e.

FIG. 26 shows a down-track cross-sectional view after the photoresist mask is removed by a conventional method, and the PP3 TS 26a-26c is plated on WS 18 and on TY 36 and insulation layer 21 at plane 45-45, and also on second insulation layer 93 behind insulation layer 25. Thereafter, a conventional series of steps may be employed to complete the PMR writer as depicted in FIG. 13. Those skilled in the art will appreciate that a similar sequence of steps may be used to form second insulation layer 93 on TY top surface 36t in an ePL trailing loop scheme before the PP3 TS is plated to yield the PMR writer in FIG. 15, for example.

While the present disclosure has been particularly shown and described with reference to, the preferred embodiments thereof, it will be understood by those skilled in the art that various changes in form and details may be made without departing from the spirit and scope of this disclosure.

We claim:

1. A perpendicular magnetic recording (PMR) writer, comprising:
    (a) a main pole layer (MP) having a MP tip formed between a hot seed (HS) layer in a trailing shield structure, and a leading shield (LS) at an air bearing surface (ABS), and configured so that a write current passing through a driving coil and a bucking coil generates a magnetic flux that passes through the MP tip and is used to write one or more magnetic bits in a magnetic medium;
    (b) a trailing loop for the magnetic flux return to the MP that comprises the HS layer, a write shield (WS) on the HS layer, an uppermost (PP3) trailing shield (TS), and a top yoke (TY) on a MP back portion;
    (c) one or both of a first non-magnetic (NM) metal layer formed in a write gap (WG) on a MP trailing side, and a second NM metal layer in a side gap (SG) that adjoins each MP side to establish an electrical connection between the MP tip and one or both of the HS layer and side shields (SS), respectively; and
    (d) a first insulation layer formed between the TY and PP3 TS to electrically isolate the MP back portion from the trailing loop.

2. The PMR writer of claim 1 further comprising a leading loop for magnetic flux return to the MP back portion that comprises the LS at the ABS and wherein a second insulation layer is formed on a lower back gap (LBG) or back gap connection (BGC) in the leading loop to electrically isolate the leading loop from the MP back portion.

3. The PMR writer of claim 2 wherein each of the first insulation layer and the second insulation layer has a thickness of about 10 nm to 300 nm.

4. The PMR writer of claim 2 wherein each of the first insulation layer and the second insulation layer is a single layer or multilayer comprised of one or more of AlOx, SiOx, TaOx, and TiOx.

5. The PMR writer of claim 1 wherein the trailing shield structure, SS, and the LS are electrically connected to a dynamic fly height (DFH) heater ground (−) pad, and the MP back portion is electrically connected to a series resistor (Rs) that is electrically connected to a DFH (+) pad.

6. The PMR writer of claim 5 wherein the electrical connection between the MP tip and one or both of the HS layer and SS is in parallel to an electrical path for a DFH heater, and does not require an additional PMR writer pad.

7. The PMR writer of claim 1 wherein each of the first and second NM metal layers is comprised of one or more of Ru, NiCr, Ta, Cu, W, or Ti.

8. The PMR writer of claim 1 wherein a portion of the second NM metal layer that adjoins each MP side extends from the ABS to a height of 50 nm to 120 nm, and has a cross-track width of 20 nm to 60 nm.

9. The PMR writer of claim 1 wherein the portion of the first NM metal layer that adjoins the MP tip extends from the ABS to a height of 20 nm to 60 nm, and has a down-track thickness from 15 nm to 22 nm.

10. The PMR writer of claim 1 wherein the first NM metal layer has a front side that is recessed to a height of 50 nm to 100 nm from the ABS.

11. The PMR writer of claim 1 wherein the first NM metal layer has a width that is less than a sum (PWA+2s) where PWA is a track width of the MP trailing side and s is a width of each side gap so that the first NM metal layer does not contact a side shield.

12. The PMR writer of claim 1 wherein the first NM metal layer has a width that is essentially equal to that of the HS layer.

13. The PMR writer structure of claim 1 further comprised of a TY extension that is formed below a front portion of the driving coil, and with a backside that adjoins a front side of the TY.

14. A head gimbal assembly (HGA) comprising:
(a) the PMR writer of claim 1; and
(b) a suspension that elastically supports the PMR writer, wherein the suspension has a flexure to which the PMR writer is joined, a load beam with one end connected to the flexure, and a base plate connected to the other end of the load beam.

15. A magnetic recording apparatus, comprising:
(a) the PMR writer of claim 1;
(b) a magnetic recording medium positioned opposite to a slider on which the PMR writer structure is formed;
(c) a spindle motor that rotates and drives the magnetic recording medium; and
(d) a device that supports the slider, and that positions the slider relative to the magnetic recording medium.

* * * * *